US012585398B2

(12) United States Patent
Yang et al.

(10) Patent No.: US 12,585,398 B2
(45) Date of Patent: Mar. 24, 2026

(54) SYSTEMS, METHODS, AND DEVICES FOR PARTITION MANAGEMENT OF STORAGE RESOURCES BASED ON WORKLOAD

(71) Applicant: Samsung Electronics Co., Ltd., Suwon-si (KR)

(72) Inventors: Zhengyu Yang, San Diego, CA (US); Bridget Molly Davis, Carlsbad, CA (US); Daniel Kim, San Marcos, CA (US); Jeffrey Chun Hung Wong, Orange, CA (US); Adnan Maruf, Miami, FL (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/376,436

(22) Filed: Oct. 3, 2023

(65) Prior Publication Data
US 2024/0036756 A1     Feb. 1, 2024

Related U.S. Application Data

(62) Division of application No. 17/168,172, filed on Feb. 4, 2021, now Pat. No. 11,782,624.
(Continued)

(51) Int. Cl.
*G06F 3/06* (2006.01)
*G06F 9/50* (2006.01)

(52) U.S. Cl.
CPC ............ *G06F 3/0644* (2013.01); *G06F 3/061* (2013.01); *G06F 3/0631* (2013.01);
(Continued)

(58) Field of Classification Search
CPC ...... G06F 3/0644; G06F 3/061; G06F 3/0631; G06F 3/0679; G06F 9/5016; G06F 9/5061; G06F 9/5083
(Continued)

(56) References Cited

U.S. PATENT DOCUMENTS

| | | | |
|---|---|---|---|
| 5,016,876 A | 5/1991 | Loffredo | |
| 5,052,685 A | 10/1991 | Lowe et al. | |
(Continued)

FOREIGN PATENT DOCUMENTS

| | | | | |
|---|---|---|---|---|
| TW | 201709091 A | 3/2017 | | |
| TW | 201814528 A | 4/2018 | | |
| WO | WO2013101947 | * 7/2013 | ............... | G06F 9/45 |

OTHER PUBLICATIONS

Bindschaedler, Laurent et al., "Hailstorm: Disaggregated Compute and Storage for Distributed LSM-based Databases", ASPLOS '20: Proceedings of the Twenty-Fifth International Conference on Architectural Support for Programming Languages and Operating Systems, Mar. 2020, pp. 301-316.
(Continued)

*Primary Examiner* — Than Nguyen
(74) *Attorney, Agent, or Firm* — Renaissance IP Law Group LLP

(57) ABSTRACT

A method of operating a storage system may include allocating a first partition of a tier of storage resources to a first client, wherein the tier operates at least partially as a storage cache, allocating a second partition of the tier of the storage resources to a second client, monitoring a workload of the first client, monitoring a workload of the second client, and reallocating the first partition of the tier of the storage resources to the first client based on the monitored workload of the first client and the monitored workload of the second client. The method may further include reallocating the second partition of the tier of the storage resources to the second client based on the monitored workload of the first client and the monitored workload of the second client.

13 Claims, 19 Drawing Sheets

Related U.S. Application Data

(60) Provisional application No. 63/088,447, filed on Oct. 6, 2020.

(52) U.S. Cl.
CPC .......... *G06F 3/0679* (2013.01); *G06F 9/5016* (2013.01); *G06F 9/5061* (2013.01); *G06F 9/5083* (2013.01)

(58) Field of Classification Search
USPC ....................................................... 711/154
See application file for complete search history.

(56) References Cited

U.S. PATENT DOCUMENTS

| | | | |
|---|---|---|---|
| 5,357,604 A | 10/1994 | San et al. | |
| 5,388,841 A | 2/1995 | San et al. | |
| 6,342,892 B1 | 1/2002 | Hook et al. | |
| 7,024,452 B1 | 4/2006 | O'Connell et al. | |
| 7,831,793 B2 | 11/2010 | Chakravarty et al. | |
| 8,032,700 B2 | 10/2011 | Bruce et al. | |
| 8,538,921 B2 | 9/2013 | Hall et al. | |
| 10,078,569 B1 | 9/2018 | Alshawabkeh et al. | |
| 10,146,469 B2 | 12/2018 | Polkovnikov et al. | |
| 10,152,505 B2 | 12/2018 | Wu et al. | |
| 10,360,127 B1 | 7/2019 | McSweeney et al. | |
| 10,579,272 B2 | 3/2020 | Tremblay et al. | |
| 10,579,281 B2 | 3/2020 | Cherubini et al. | |
| 10,691,357 B2 | 6/2020 | Ainscow et al. | |
| 2005/0071599 A1 | 3/2005 | Modha et al. | |
| 2006/0020944 A1 | 1/2006 | King et al. | |
| 2006/0031242 A1 | 2/2006 | Hall, Jr. et al. | |
| 2013/0173849 A1* | 7/2013 | Balakrishnan ........ | G06F 3/0659 |
| | | | 711/E12.008 |
| 2013/0232261 A1* | 9/2013 | Wright ................ | H04L 41/5009 |
| | | | 709/224 |
| 2015/0067262 A1* | 3/2015 | Uttamchandani ..... | G06F 9/5077 |
| | | | 711/129 |
| 2016/0041758 A1 | 2/2016 | Iwasaki et al. | |
| 2017/0060935 A1 | 3/2017 | Wu et al. | |
| 2018/0081594 A1 | 3/2018 | Jung et al. | |
| 2018/0089262 A1 | 3/2018 | Bhattacharjee et al. | |
| 2019/0042457 A1 | 2/2019 | Doshi et al. | |
| 2019/0196969 A1 | 6/2019 | Yang et al. | |
| 2019/0205153 A1 | 7/2019 | Niestemski et al. | |
| 2019/0265915 A1 | 8/2019 | Greenwood et al. | |
| 2020/0133739 A1 | 4/2020 | Jain et al. | |
| 2020/0175074 A1* | 6/2020 | Li ....................... | G06F 12/0871 |
| 2020/0286556 A1* | 9/2020 | Bazarsky ........... | G11C 13/0004 |
| 2020/0341961 A1 | 10/2020 | Gong et al. | |

OTHER PUBLICATIONS

Bjorling, Matias, "From Open-Channel SSDs to Zoned Namespaces", Western Digital, PowerPoint Presentation, Jan. 23, 2019, 18 pages.

Busch, Axel et al., "Automated Workload Characterization for I/O Performance Analysis in Virtualized Environments", ICPE '15: Proceedings of the 6th ACM/SPEC International Conference on Performance Engineering, Jan. 2015, pp. 265-276.

Carns, Philip et al., "24/7 Characterization of Petascale I/O Workloads", 2009 IEEE International Conference on Cluster Computing and Workshops, 2009, pp. 1-10.

Cho, Kyungwoon et al., "Virtual Interval Caching Scheme for Interactive Multimedia Streaming Workload", Computer and Information Sciences—ISCIS 2003, pp. 276-283.

Choi, Changho, "Multi-stream write SSD," Flash Memory Summit, 2016.

Courville, Jace et al., "Understanding storage I/O behaviors of mobile applications", 2016 32nd Symposium on Mass Storage Systems and Technologies (MSST), 2016, pp. 1-11.

Dinaki, Hossein Ebrahimi et al., "Boosted Metaheuristic Algorithms for QoE-Aware Server Selection in Multiplayer Cloud Gaming", IEEE Access, vol. 8, pp. 60468-60483, Mar. 2, 2020.

Guerra, Jorge et al., "Cost Effective Storage Using Extent Based Dynamic Tiering", In Proceedings of the 9th USENIX Conference on File and Strorage Technologies (FAST'11), USENIX Association, USA, Feb. 2011, 14 pages.

Gunasekaran, Raghul et al., "Comparative I/O workload characterization of two leadership class storage clusters", PDSW'15: Proceedings of the 10th Parallel Data Storage Workshop, Nov. 2015, pp. 31-36.

Guo, Yong et al., "The Game Trace Archive", 2012 11th Annual Workshop on Network and Systems Support for Games (NetGames), 2012, pp. 1-6.

Gupta, Aayush et al., "DFTL: a flash translation layer employing demand-based selective caching of page-level address mappings", ACM SIGPLAN Notices, vol. 44, Issue 3, Mar. 2009, pp. 229-240.

Huang, Chun-Ying et al., "GamingAnywhere: an open cloud gaming system", MMSys '13: Proceedings of the 4th ACM Multimedia Systems Conference, Feb. 2013, pp. 36-47.

Intel. Gaming System Requirements for 2020's Hottest Titles—Intel. [Online]. Available: https://www.intel.com/content/www/us/en/gaming/resources/system-requirements.html.

Kim, Youngjae et al., "Workload characterization of a leadership class storage cluster", 2010 5th Petascale Data Storage Workshop (PDSW '10), 2010, pp. 1-5.

Lee, Sang-Won et al., "A log buffer-based flash translation layer using fully-associative sector translation", ACM Transactions on Embedded Computing Systems, vol. 6, Issue 3, Jul. 2007, pp. 18-es.

Lehn, Max et al., "On synthetic workloads for multiplayer online games: a methodology for generating representative shooter game workloads", Multimedia Systems, vol. 20, Issue 5, Oct. 2014, pp. 609-620.

Liu, Yang et al., "Server-Side Log Data Analytics for I/O Workload Characterization and Coordination on Large Shared Storage Systems", SC '16: Proceedings of the International Conference for High Performance Computing, Networking, Storage and Analysis, 2016, pp. 819-829.

Luttgau, Jakob et al., "Toward Understanding I/O Behavior in HPC Workflows", 2018 IEEE/ACM 3rd International Workshop on Parallel Data Storage & Data Intensive Scalable Computing Systems (PDSW-DISCS), 2018, pp. 64-75.

Megiddo, Nimrod et al., "Outperforming LRU with an adaptive replacement cache algorithm", Computer, vol. 37, No. 4, pp. 58-65, Apr. 2004.

Morillo, Pedro et al., "Workload characterization in multiplayer online games", ICCSA'06: Proceedings of the 6th international conference on Computational Science and Its Applications—vol. Part I, May 2006, pp. 490-499.

Narula, Herman, "A billion new players are set to transform the gaming industry", Wired UK, Dec. 29, 2019, Retrieved May 19, 2022, from https://www.wired.co.uk/article/worldwide-gamers-billion-players.

Pan, Xiaoyue et al., "A Modeling Framework for Reuse Distance-Based Estimation of Cache Performance," 2015 IEEE International Symposium on Performance Analysis of Systems and Software (ISPASS), Philadelphia, PA, 2015, pp. 62-71.

Patel, Tirthak et al., "Revisiting I/O Behavior in Large-Scale Storage Systems: The Expected and the Unexpected", SC '19: Proceedings of the International Conference for High Performance Computing, Networking, Storage and Analysis, Nov. 2019 Article No. 65, pp. 1-13.

Paulsen, John, "Supercharge your xbox with SSD speed and 2TB to hold all your games: New Game Drive for Xbox SSD", Seagate Blog, Jul. 26, 2019, https://blog.seagate.com/consumers/supercharge-your-xbox-with-ssd-speed-2tb-to-hold-all-your-games-new-game-drive-for-xbox-ssd/.

Priday, Richard, "PS5 SSD is so fast, developers need to redesign their games", Tom's Guide, Jun. 5, 2020, https://www.tomsguide.com/news/ps5-ssd-is-so-fast-developers-need-to-redesign-their-games.

(56)        References Cited

OTHER PUBLICATIONS

Ramsey, Robert, "PS5 SSD: Why it's better than HDD", Push Square, Aug. 3, 2021, https://www.pushsquare.com/guides/ps5-ssd-why-its-better-than-hdd.

Roca, Jordi et al., "Workload characterization of 3d games", 2006 IEEE International Symposium on Workload Characterization, 2006, pp. 17-26.

Roth, Philip C., "Characterizing the I/O behavior of scientific applications on the Cray XT", PDSW '07: Proceedings of the 2nd international workshop on Petascale data storage: held in conjunction with Supercomputing '07Nov. 2007 pp. 50-55.

Sen, Rathijit et al., "Reuse-based online models for caches", SIGMETRICS '13: Proceedings of the ACM SIGMETRICS/ international conference on Measurement and modeling of computer systems, Jun. 2013, pp. 279-292.

Smirni, Evgenia et al., "Workload Characterization of Input/Output Intensive Parallel Applications", Computer Performance Evaluation Modelling Techniques and Tools, Tools 1997, Lecture Notes in Computer Science, vol. 1245, pp. 169-180, Springer, Berlin, Heidelberg.

Triebel, Tonio et al., "Generation of synthetic workloads for multiplayer online gaming benchmarks", 2012 11th Annual Workshop on Network and Systems Support for Games (NetGames), 2012, pp. 1-6.

Webster, Andrew "Amazon announces New Cloud Gaming service called luna", The Verge, Sep. 24, 2020, Retrieved May 19, 2022, from https://www.theverge.com/2020/9/24/21451371/amazon-luna-cloud-gaming-service-twitch-alexa-controller.

Wikimedia Foundation, "Disk sector", Wikipedia, Oct. 18, 2021, from https://en.wikipedia.org/wiki/Disk_sector.

Wikimedia Foundation. (May 14, 2022). List of video game developers. Wikipedia. Retrieved May 19, 2022, from https://en.wikipedia.org/wiki/List_of_video_game_developers.

Windows-Driver-Content. (n.d.), "Download and install the windows ADK", Microsoft Docs. Retrieved May 20, 2022, from https://docs.microsoft.com/en-us/windows-hardware/get-started/adk-install.

Windows-Driver-Content. (n.d.), "Windows performance analyzer", Microsoft Docs. Retrieved May 20, 2022, from https://docs.microsoft.com/en-us/windows-hardware/test/wpt/windows-performance-analyzer.

Windows-Driver-Content. (n.d.). "Windows performance recorder", Microsoft Docs. Retrieved May 20, 2022, from https://docs.microsoft.com/en-us/windows-hardware/test/wpt/windows-performance-recorder.

Yang, Jingpei et al., "AutoStream: automatic stream management for multi-streamed SSDs", SYSTOR '17: Proceedings of the 10th ACM International Systems and Storage Conference, May 2017, Article No. 3, pp. 1-11.

Yang, Zhengyu et al., "GREM: Dynamic SSD Resource Allocation In Virtualized Storage Systems With Heterogeneous IO Workloads", 2016 IEEE 35th International Performance Computing and Communications Conference (IPCCC), Las Vegas, NV, 2016, 8 pages.

Yang, Zhengyu et al., "GReM: Dynamic SSD resource allocation in virtualized storage systems with heterogeneous IO workloads", 2016 IEEE 35th International Performance Computing and Communications Conference (IPCCC), 2016, pp. 1-8.

Yang, Zhengyu, "Flash-based Storage Management in Cloud Computing Datacenter Infrastructures", Dissertation, Boston, Massachusetts, Northeastern University, Aug. 2018, 163 pages.

Zheng, Shengan et al., "Ziggurat: a tiered file system for non-volatile main memories and disks", FAST'19: Proceedings of the 17th USENIX Conference on File and Storage Technologies, Feb. 2019, pp. 207-219.

Zhu, Timothy, "Meeting tail latency SLOs in shared networked storage", Ph. D., dissertation, 2015.

Zyulkyarov, Ferad et al., "Atomic Quake: Using Transactional Memory in an Interactive Multiplayer Game Server", ACM SIGPLAN Notices, vol. 44, Issue 4, Apr. 2009, pp. 25-34.

Ahmad, Irfan, "Easy and Efficient Disk I/O Workload Characterization in VMware ESX Server", 2007 IEEE 10th International Symposium on Workload Characterization, 2007, pp. 149-158.

Ali-Eldin, Ahmed et al., "Analysis and characterization of a video-on-demand service workload", MMSys '15: Proceedings of the 6th ACM Multimedia Systems Conference, Mar. 2015, pp. 189-200.

Final Office Action for U.S. Appl. No. 17/168,172, mailed Feb. 16, 2023.

Notice of Allowance for U.S. Appl. No. 17/168,172, mailed Jun. 2, 2023.

Office Action for U.S. Appl. No. 17/168,172, mailed Aug. 25, 2022.

* cited by examiner

Non-read-intensive I/O Requests

| Time | R/W | Start Address | I/O Size | Cache Line Spot |
|------|------|---------------|----------|-----------------|
| T0 | Write | A | 8KB | 2 |
| T1 | Write | B | 16KB | 4 |
| T2 | Write | C | 8KB | 2 |
| T3 | Write | D | 8KB | 2 |
| T4 | Write | C | 16KB | 4 |
| T5 | Read | D | 4KB | 1 |

904

T0-T3

| Addr | A | A | B | B | B | B | C | C | C | D | D |
|------|-----|-------|-------|-------|-------|-------|-------|-------|-------|-------|-------|
| Data | [4KB] | [4KB] | [4KB] | [4KB] | [4KB] | [4KB] | [4KB] | [4KB] | [4KB] | [4KB] | [4KB] |

Write

902

T4

| Addr | C' | C' | C' | C' | C' | C' | B | B | C | C | D | D |
|------|-----|-----|-----|-----|-----|-----|-------|-------|-------|-------|-------|-------|
| Data | [4KB] | [4KB] | [4KB] | [4KB] | [4KB] | [4KB] | [4KB] | [4KB] | [4KB] | [4KB] | [4KB] | [4KB] |

Evict 2 slots of A and B and write 4 slots of C'

902

T5

| Addr | C' | C' | C' | C' | B | B | C | C | D | D | D |
|------|-----|-----|-----|-----|-------|-------|-------|-------|-------|-------|-------|
| Data | [4KB] | [4KB] | [4KB] | [4KB] | [4KB] | [4KB] | [4KB] | [4KB] | [4KB] | [4KB] | [4KB] |

Read

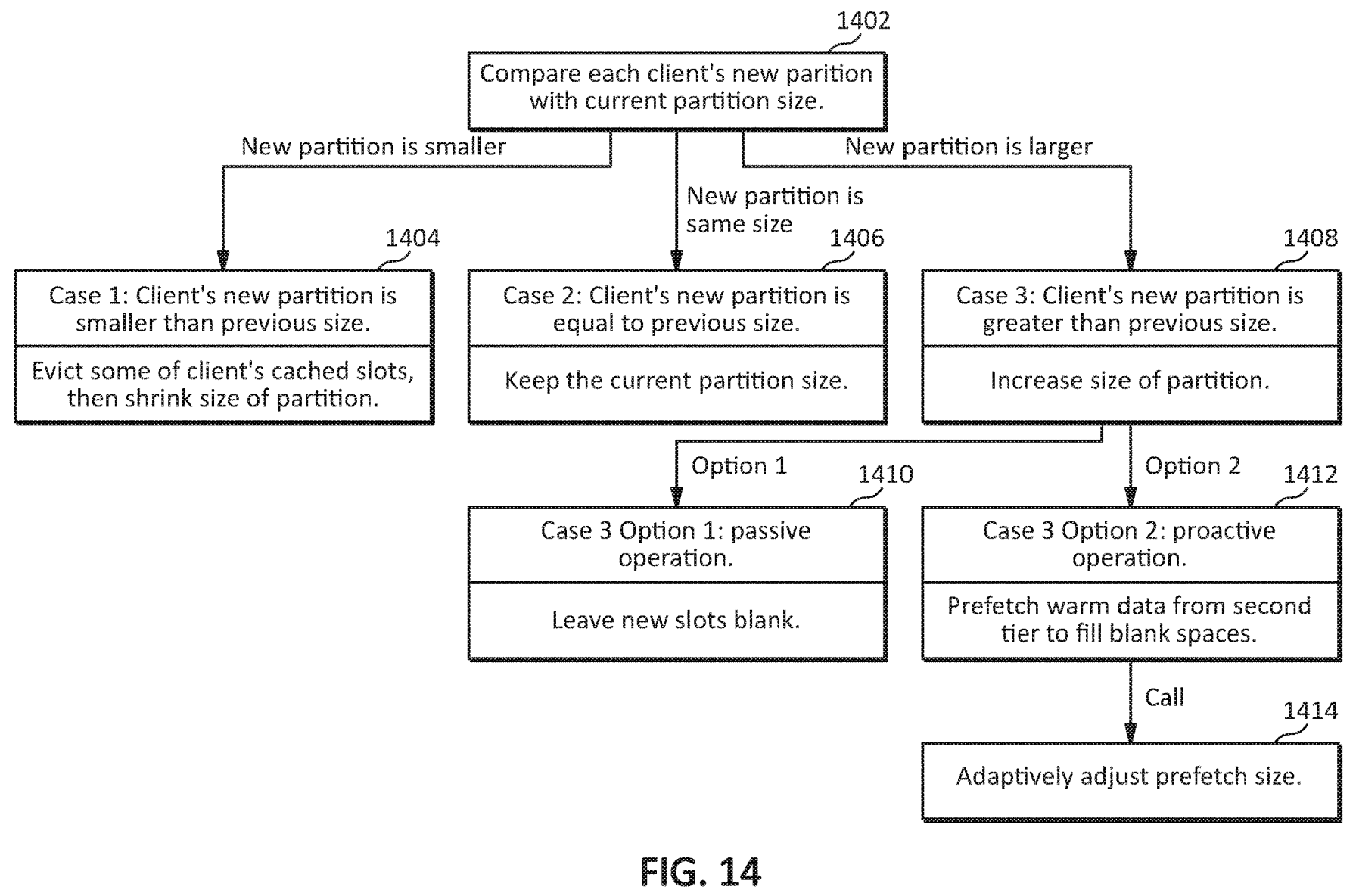

Compare each client's new partition with current partition size.

New partition is smaller

New partition is same size

New partition is larger

1404

Case 1: Client's new partition is smaller than previous size.

Evict some of client's cached slots, then shrink size of partition.

1406

Case 2: Client's new partition is equal to previous size.

Keep the current partition size.

1408

Case 3: Client's new partition is greater than previous size.

Increase size of partition.

Option 1          1410

Case 3 Option 1: passive operation.

Leave new slots blank.

Option 2          1412

Case 3 Option 2: proactive operation.

Prefetch warm data from second tier to fill blank spaces.

Call          1414

Adaptively adjust prefetch size.

FIG. 14

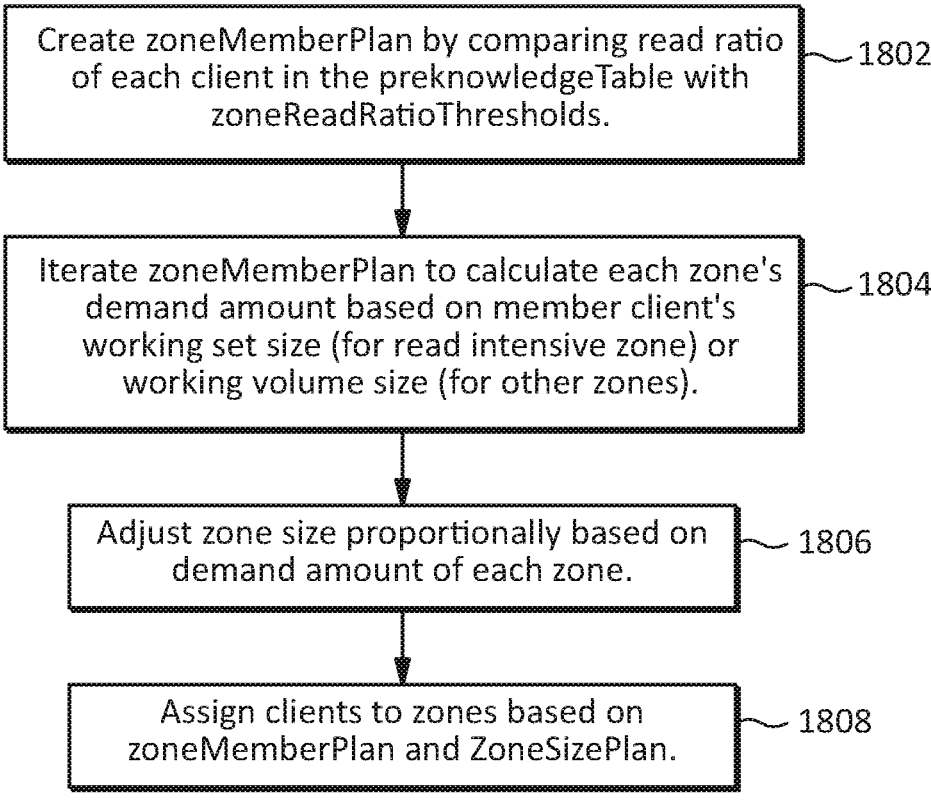

Create zoneMemberPlan by comparing read ratio of each client in the preknowledgeTable with zoneReadRatioThresholds. ∼1802

Iterate zoneMemberPlan to calculate each zone's demand amount based on member client's working set size (for read intensive zone) or working volume size (for other zones). ∼1804

Adjust zone size proportionally based on demand amount of each zone. ∼1806

Assign clients to zones based on zoneMemberPlan and ZoneSizePlan. ∼1808

FIG. 18

SYSTEMS, METHODS, AND DEVICES FOR PARTITION MANAGEMENT OF STORAGE RESOURCES BASED ON WORKLOAD

CROSS-REFERENCE TO RELATED APPLICATION

This application is a divisional of U.S. patent application Ser. No. 17/168,172, filed Feb. 4, 2021, now allowed, which claims priority to, and the benefit of, U.S. Provisional Patent Application Ser. No. 63/088,447 titled "Systems, Methods, and Devices for Disaggregated Storage with Partition Management" filed Oct. 6, 2020, both of which are incorporated by reference.

TECHNICAL FIELD

This disclosure relates generally to data processing, and more specifically to systems, methods, and devices for partition management of storage resources.

BACKGROUND

Storage systems may divide storage resources into partitions for use by one or more storage clients.

The above information disclosed in this Background section is only for enhancement of understanding of the background of the invention and therefore it may contain information that does not constitute prior art.

SUMMARY

A method of operating a storage system may include allocating a first partition of a tier of storage resources to a first client, wherein the tier operates at least partially as a storage cache, allocating a second partition of the tier of the storage resources to a second client, monitoring a workload of the first client, monitoring a workload of the second client, and reallocating the first partition of the tier of the storage resources to the first client based on the monitored workload of the first client and the monitored workload of the second client. The method may further include reallocating the second partition of the tier of the storage resources to the second client based on the monitored workload of the first client and the monitored workload of the second client. The first partition may be reallocated based on an input and/or output (I/O) demand of the workload of the first client. The first partition may be reallocated based on an I/O demand of the workload of the second client. The first partition may be reallocated based on a performance change estimation of the workload of the first client. The first partition may be reallocated based on a performance change estimation of the workload of the second client. The first partition may be reallocated based on a read-write ratio of the workload of the first client. The first partition may be reallocated based on a working set of the workload of the first client. The first partition may be reallocated based on a working volume of the workload of the first client.

A system may include a storage layer comprising a tier of storage resources configured to operate at least partially as a storage cache, an application server layer configured to process I/O requests for the storage layer from a first client and a second client, monitor logic configured to monitor a workload of the first client and a workload of the second client, decision logic configured to determine an adjusted partition scheme based on the monitored workload of the first client and the monitored workload of the second client, and partition logic configured to allocate a first partition of the tier of storage resources to the first client, allocate a second partition of the tier of storage resources to the second client, and reallocate the first partition of the tier of storage resources to the first client based on the adjusted partition scheme. The monitor logic may include an I/O filter. The monitor logic may include a hypervisor. The application server layer may include an interface configured to provide a standardized I/O interface to the first client and the second client.

A method of partitioning a tier of storage resources may include determining a read working volume and a write working volume of a first client of the tier and a second client of the tier, determining a workload type based on the read working volume and the write working volume, and partitioning the tier of storage resources between the first client and the second client based on the workload type. The method may further include determining a read ratio based on the read working volume and the write working volume, and determining the workload type based on the read ratio. Determining the workload type based on the read ratio may include comparing the read ratio to a threshold. The method may further include determining a working set size based on the workload type, and partitioning the tier of storage resources between the first client and the second client based on the working set size. The method may further include determining a working volume size based on the workload type, and partitioning the tier of storage resources between the first client and the second client based on the working volume size.

A method of detecting a burst of accesses of a tier of storage resources may include monitoring a workload of the tier of storage resources, determining a burst degree of the workload, and detecting the burst of accesses based on the burst degree. Detecting the burst of accesses based on the burst degree may include comparing the burst degree to a burst threshold. Determining a burst degree of the workload may include determining a read intensity of the workload. Determining the burst degree of the workload may include determining a change in a working volume of the workload, and calculating the burst degree based on the change in the working volume of the workload. Determining the burst degree of the workload may include determining a change in a working set of the workload, and calculating the burst degree based on the change in the working set of the workload.

A method of partitioning a tier of storage resources may include monitoring a workload of the tier of storage resources, determining a first cache demand for a first client based on the monitored workload, determining a second cache demand for a second client based on the monitored workload, allocating a first partition of the tier of storage resources to the first client based, at least in part, on the first cache demand, and allocating a second partition of the tier of storage resources to the second client based, at least in part, on the second cache demand. The first partition and the second partition may be allocated, at least in part, in proportion to the first cache demand and the second cache demand. Determining the first cache demand may include determining a first workload amount for the first client, and determining the second cache demand may include determining a second workload amount for the second client. The first workload amount and the second workload amount may be determined, at least in part, based on a read intensity of the monitored workload. The first workload amount may be determined based, at least in part, on a working volume size of the first client, and the second workload amount may be determined based, at least in part, on a working volume size of the second client. The first workload amount may be determined based, at least in part, on a working set size of the first client, and the second workload amount may be determined based, at least in part, on working set size of the second client. The method may further include weighting the first workload amount, and weighting the second workload amount. The method may further include sorting the first client and the second client based on the weighted first workload amount and the second weighted workload amount. The method may further include allocating the first partition of the tier of storage resources to the first client based, at least in part, on the weighted first workload amount, and allocating the second partition of the tier of storage resources to the second client based, at least in part, on the weighted second workload amount.

A method of partitioning a tier of storage resources may include determining a first partition plan for a first client and a second client for the tier of storage resources, determining a first expected cache hit amount based on the first partition plan, determining a second partition plan for the first client and the second client for the tier of storage resources, determining a second expected cache hit amount based on the second partition plan, and selecting one of the first partition plan or the second partition plan based on the first expected cache hit amount and the second expected cache hit amount. The method may further include determining a first expected hit ratio for the first client based on the first partition plan, determining a second expected hit ratio for the second client based on the first partition plan, determining a first expected working volume for the first client based on the first partition plan, and determining a second expected working volume for the second client based on the first partition plan. Determining the first expected cache hit amount may include determining a weighted sum of the first expected hit ratio and the first expected working volume for the first client and the second expected hit ratio and the second expected working volume for the second client. The method may further include determining a third partition plan for the first client and the second client for the tier of storage resources, determining a third expected cache hit amount based on the third partition plan, and selecting one of the first partition plan, the second partition plan, or the third partition plan based on the first expected cache hit amount, the second expected cache hit amount, and the third expected cache hit amount.

A method of determining an expected cache hit ratio for a client of a tier of storage resources may include recording I/O transactions by the client for the tier of storage resources, determining a reuse distance based on the recorded I/O transactions, and determining the expected cache hit ratio based on the reuse distance. Determining the expected cache hit ratio may include determining a distribution function of reuse distances based on the recorded I/O transactions, and determining the expected cache hit ratio based on the distribution function. The expected cache hit ratio may be based on a difference between a reuse distance and a cache size.

A method of determining an expected working volume for a client of a tier of storage resources may include recording I/O transactions by the client for the tier of storage resources, determining a weighted average of the recorded I/O transactions, and determining the expected working volume based on the weighted average. The weighted average may be exponentially weighted.

A method of re-partitioning a tier of storage resources may include allocating a first partition of the tier of storage resources to a client, wherein the tier operates at least partially as a storage cache, allocating a second partition of the tier of storage resources to the client, wherein the size of the second partition may be greater than the size of the first partition, and passively updating the second partition. Passively updating the second partition may include updating the second partition based on one or more I/O transactions of a workload of the client. The second partition may be allocated based on a partition adjustment and content update window.

A method of prefetching data for a tier of storage resources may include allocating a first partition of the tier of storage resources to a client, wherein the tier operates at least partially as a storage cache, determining a pattern of I/O request sizes for the client, allocating a second partition of the tier of storage resources to the client, wherein the size of the second partition may be greater than the size of the first partition, and prefetching data for the second partition using a prefetch data size based on the pattern of I/O request sizes. The prefetch data size may include a top I/O size popularity of the client. The method may further include applying an amplification factor to the prefetch data size.

A method of partitioning a tier of storage resources may include allocating a first partition in a first zone of the tier of storage resources to a first client based on preknowledge of a characteristic of the first client, and allocating a second partition in a second zone of the tier of storage resources to a second client based on preknowledge of the characteristic of the second client. The method may further include adjusting a size of the first zone and a size of the second zone. The size of the first zone and the size of the second zone may be adjusted proportionally. The size of the first zone may be adjusted based on a first demand amount of the first zone, and the size of the second zone may be adjusted based on a second demand amount of the second zone. The first zone may include a read-intensive zone, and the size of the first zone may be adjusted based on a working set size. The first zone may include a write-intensive zone, and the size of the first zone may be adjusted based on a working volume size. The first zone may include a read-write-mixed zone, and the size of the first zone may be adjusted based on a working volume size. The characteristic may include at least one of a read ratio, a working volume size, or a working set size.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 9 illustrates an example embodiment of a mixed read and write workload in accordance with example embodiments of the disclosure.

FIG. 14 illustrates an example embodiment of a partition and content update workflow in accordance with example embodiments of the disclosure.

FIG. 18 illustrates an example embodiment of a pre-knowledge-based zoning workflow in accordance with example embodiments of the disclosure.

DETAILED DESCRIPTION

1. Introduction 1.1 Overview

Figure 1:
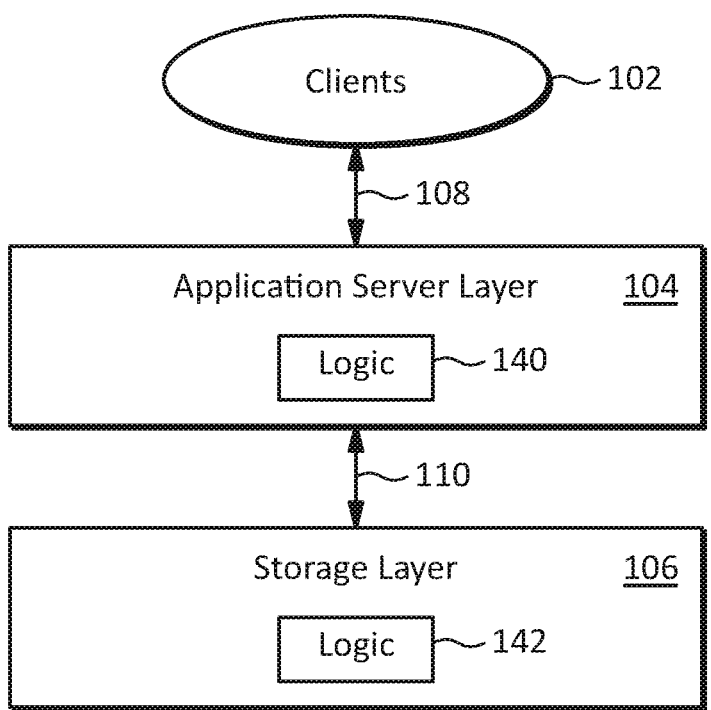
FIG. 1 illustrates an embodiment of a storage system architecture in accordance with example embodiments of the disclosure.

A storage system having one or more tiers of storage resources may partition one or more of the tiers into individual partitions, each of which may be accessed by one of multiple storage clients. In some embodiments, a partition manager system in accordance with example embodiments of the disclosure may periodically and/or dynamically adjust the partition size for one or more of the tiers for one or more of the storage clients. The partition adjustment process, which may be referred to as re-partitioning, may improve or optimize the overall performance of a storage system and/or ensure fairness to storage clients. In some embodiments, a partition manager system in accordance with example embodiments of the disclosure may provide automated re-partitioning decision making and/or operations based on one or more factors such as runtime workload analysis, performance improvement estimation, quality-of-service (QoS), service level agreements (SLAs), and/or the like.

1.2 Storage Workloads

In some embodiments of storage systems used for game streaming, a large percentage of gameplay input and/or output (I/O) workloads may be read-intensive or even read-only. Some embodiments of partition manager systems and methods in accordance with example embodiments of the disclosure may provide different cache re-partitioning strategies based on the differences between read-intensive and non-read-intensive workloads.

In some embodiments of storage systems, workloads for different clients may have different behaviors, and even the same workload for one client may vary during runtime. Some embodiments of partition manager systems and methods in accordance with example embodiments of the disclosure may equally assign the top-tier storage resources to each client and/or allow clients to conduct free competition for top-tier storage resources based on client demands. However, in some embodiments, either or both of these techniques may underutilize storage resources, including top-tier storage resources. Some embodiments of partition manager systems and methods in accordance with example embodiments of the disclosure may periodically capture and/or predict I/O changes to adaptively reallocate storage resources, including top-tier resources, as well as using different partitioning methodologies for workloads having different burst levels. Depending on the implementation details, this may improve storage cache hit ratios and/or reduce I/O management costs.

In some embodiments of storage systems, I/O size distributions may be different for different workloads. Some embodiments of partition manager systems and methods in accordance with example embodiments of the disclosure may use an adaptive I/O size for first-second-tier prefetch operations. Depending on the implementation details, this may increase overall hit ratios and/or reduce I/O latencies.

In some embodiments of storage systems, during a deployment stage, there may not be sufficient client runtime data available to implement an effective allocation of top-tier cache storage to clients. Some embodiments of partition manager systems and methods in accordance with example embodiments of the disclosure may use preknowledge (e.g., prior-knowledge) of clients, for example, from a client pattern library, vendor selection hardware and/or software, QoS, SLA, and/or the like, to perform an initial partition of top-tier cache storage to clients. In some embodiments, different clients may be placed into different workload zones based on preknowledge of one or more factors such as workload read ratio, workload working set size, and/or the like. In some embodiments, zoning may be physical zoning, virtual zoning, and/or any combination thereof. In physical zoning, granularity may be greater than or equal to the size of a storage device (e.g., grouping multiple storage devices into a zone. In virtual zoning, granularity may be less than or equal to a storage device (e.g., zoning inside a storage device).

1.3 Partition Management

Some embodiments of partition management systems and/or method in accordance with example embodiments of the disclosure may periodically and/or dynamically re-partition one or more tiers (e.g., a top-tier) of a storage system that may be shared by multiple clients. Some embodiments may allocate top-tier storage resources to clients that need it (based, for example, on dynamic I/O demands) and/or to clients that may benefit from it the most (based, for example, on estimates of performance improvement). The allocation may be based, for example, on analyzing runtime workload parameters such as read-write ratios, working set changes, working volume changes, and/or the like.

Some embodiments may provide a partition optimization framework that may take into consideration various factors for some or all storage clients such as changes in workload during a recent workload monitoring window, the weight of one or more clients (e.g., base on QoS, SLAs and/or the like), the estimated hit ratio that may be expected if a partition size is increased or decreased, and/or the like.

Some embodiments may provide a burst detection method to determine whether a current workload is bursty. If the current workload is bursty, the system may not have adequate time to apply a partition optimization framework before an I/O burst arrives. Thus, for bursty workloads, an aggressive partitioning scheme may be used to quickly partition a top-tier of storage between clients. In some embodiments, an aggressive partitioning scheme may adjust partitions proportionally based on recent demand as determined, for example, by a working volume size (for non-read-intensive workloads) or a working set size (for read-intensive workloads).

Some embodiments may implement a technique to perform an initial partitioning by separating clients into different zones based on preknowledge during a deployment stage. Depending on the implementation details, a zone-based partitioning technique may reduce device-side write amplification, over-provisioning, total cost of ownership, and/or the like, and may improve latency, throughput, predictability, and/or the like.

1.4 Storage Types

Partition management systems, methods, apparatus, workflows, and/or the like in accordance with example embodiments of the disclosure may be used with any type of storage such as direct-attached storage (DAS), storage area networks (SANs), disaggregated storage, and/or the like.

In DAS systems in accordance with example embodiments of the disclosure, storage devices such as solid state drives (SSDs) and hard disk drives (HDDs) may be attached to a single server. This configuration may provide relatively high performance for any workloads running on that server. The storage device capacity and/or performance may be available to that server, and capacity and/or performance may scale-up (adding drives to the server) or scale-out (by adding additional servers).

In SAN systems in accordance with example embodiments of the disclosure, storage devices may be arranged in a storage array that may be provisioned to be available one or many servers on a network. A SAN system may allocate storage to many servers (e.g., dozens or hundreds of servers), which may increase capacity utilization.

In some embodiments of cloud computing in accordance with example embodiments of the disclosure, client devices may be implemented as light terminals that may assign tasks and/or gather results of assigned tasks, while heavy computational tasks may be performed on remote distributed server clusters. This light-terminal/heavy-datacenter structure may involve high availability storage systems. In some embodiments, storage input and/or output (I/O) may be a bottleneck, for example, in datacenters.

In disaggregated storage systems in accordance with example embodiments of the disclosure, some number of storage devices may function as a logical pool of storage that may be allocated to any server on a network, for example, over a high-performance network fabric. In some embodiments, disaggregated storage system may provide the performance of local storage with the flexibility of SAN, and/or may be dynamically reconfigurable which may enable physical resources to be reconfigured to improved or maximize performance and/or reduce latency.

2. Architecture

FIG. 1 illustrates an embodiment of a storage system architecture in accordance with example embodiments of the disclosure. The architecture illustrated in FIG. 1 may represent hardware, software, workflow, and/or any combination thereof.

The embodiment illustrated in FIG. 1 may include an application server layer 104 and a storage layer 106. The storage layer 106 may include any number and/or types of storage resources that may be configured as a pool having one or more tiers, including those described below. For example, a first tier of storage resources may operate as a storage cache for one or more other tiers of storage resources. One or more of the tiers may be divided into partitions that may be allocated to one or more of the storage clients 102.

The application server layer 104 may include any number and/or types of compute and/or I/O resources, including those described below, configured to enable the one or more storage clients 102 to access the pool of storage resources in the storage layer 106.

The application server layer 104 may be connected to one or more of the storage clients 102 through one or more connections 108. The application server layer 104 may be connected to the storage layer 106 through one or more connections 110. The connections 108 and 110 may be implemented with any number and/or type of networks, interconnects, and/or the like, including those described below.

The application server layer 104 and storage layer 106 may include logic 140 and 142, respectively, that may be used to implement any functions performed by the respective layers such as monitoring operations of the system, making decisions, performing system operations, performing calculations, and/or the like. In some embodiments, logic 140 and 142 may implement any of the techniques disclosed herein such as monitoring workloads of one or more tiers of the storage layer 106, determining a read intensity of a workload, detecting bursts in I/O accesses, determining working volumes, determining working sets, determining a re-partitioning strategy, partitioning one or more tiers of a storage layer, implementing a partitioning strategy, implementing a client zoning technique, and/or the like.

The logic 140 and 142, as well as any of the methods, techniques, processes, and/or the like described herein, may be implemented with hardware, software, or any combination thereof. For example, in some embodiments, any of the logic 140 and 142 may be implemented with combinational logic, sequential logic, one or more timers, counters, registers, state machines, complex programmable logic devices (CPLDs), field programmable gate arrays (FPGAs), application specific integrated circuits (ASICs), complex instruction set computer (CISC) processors and/or reduced instruction set computer (RISC) processors, and/or the like executing instructions stored in volatile memories such as dynamic random access memory (DRAM) and/or static random access memory (SRAM), nonvolatile memory such as flash memory, and/or the like, as well as graphics processing units (GPUs), neural processing units (NPUs), and/or the like.

The operations and/or components described with respect to the embodiment illustrated in FIGS. 1, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components may be illustrated as individual components, in some embodiments, some components shown separately may be integrated into single components, and/or some components shown as single components may be implemented with multiple components.

2.1 Data Center Architecture

Figure 2:
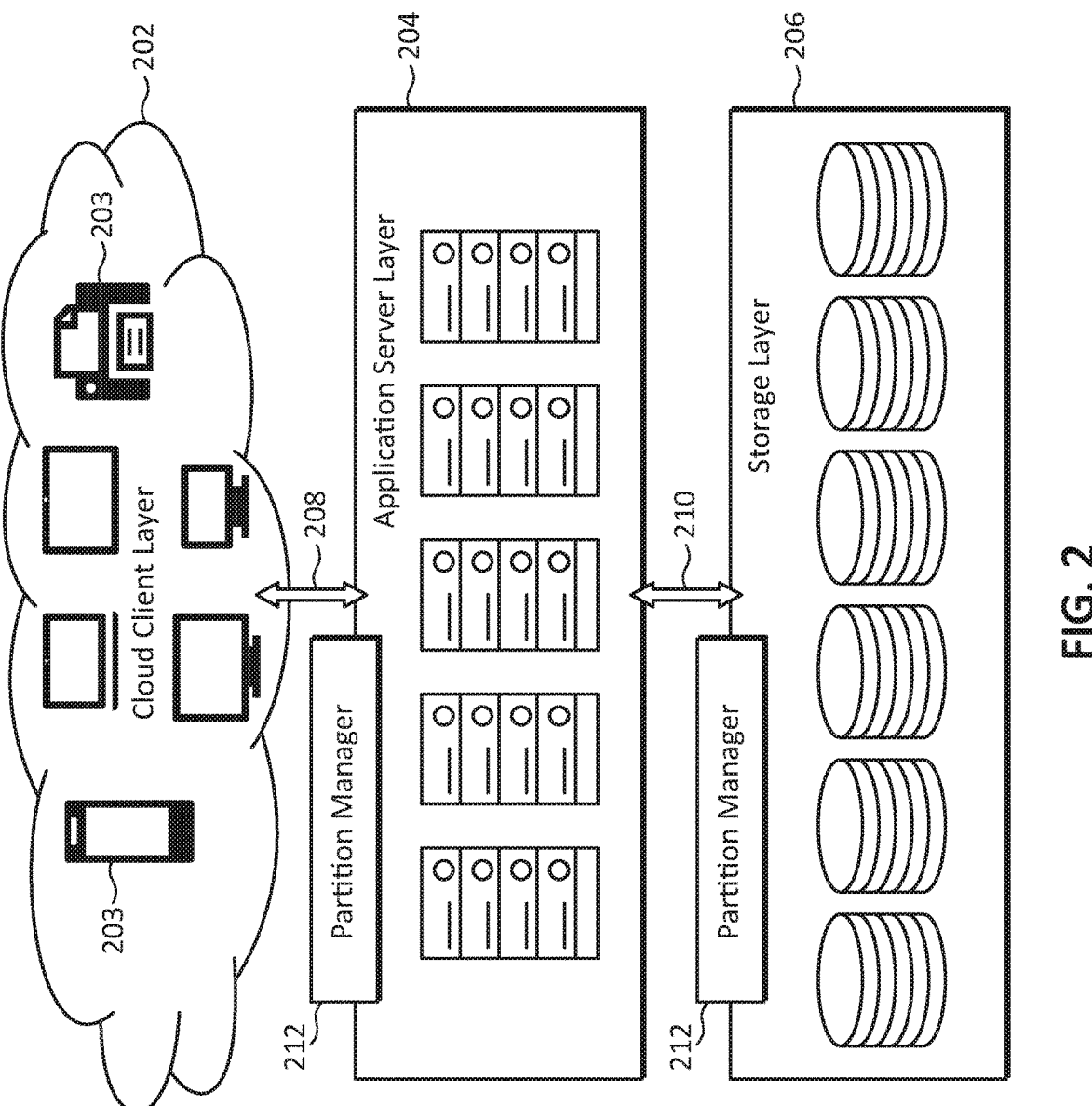
FIG. 2 illustrates an example embodiment of a storage system architecture in accordance with example embodiments of the disclosure.

FIG. 2 illustrates an example embodiment of a storage system architecture in accordance with example embodiments of the disclosure. The system illustrated in FIG. 2 may include a cloud client layer (CCL) 202, an application server layer (ASL) 204 and a storage layer 206. In some embodiments, the storage layer 206 may be implemented as a backend storage layer (BSL). The client cloud layer 202 and application server layer 204 may be connected, for example, by one or more networks 208. The application server layer 204 and storage layer 206 may be connected, for example, by an I/O path 210.

In some embodiments, the client cloud layer 202 may include any number and/or types of cloud client devices 203 (e.g., heterogeneous devices) which may connect to and/or between the client cloud layer 202 through any number and/or types of networks, and may eventually connect to the application server layer 204 through one or more of the networks 208. Examples of cloud client devices 203 may include desktop and/or laptop computers, servers, smart phones, tablets, printers, scanners, internet connected appliances and/or the like. The client cloud layer 202 may handle any number of the following conditions and/or processes: I/O congestion, delays and/or timeouts, workload surge, dropped packets, and/or the like.

The one or more networks 208 may be implemented with any number and/or types of network including local area networks (LANs), metropolitan area networks (MANs), wide area networks (WANs), and/or the like, based on any number and/or types of network hardware, software, protocols, and/or the like. Examples of network types may include Ethernet, InfiniBand, Fibre Channel, Wi-Fi, Bluetooth, and/or the like.

In some embodiments, the application server layer 204 may be implemented with any number and/or types of server apparatus including motherboards, switchboards, I/O cards and/or modules, backplanes, midplanes, network interface cards (NICs), and/or the like configured in one or more chassis, server racks, groups of server racks, data rooms, datacenters, edge datacenters, mobile edge datacenters, and/or any combinations thereof, and/or the like. The application server layer 204 may handle any number of the following conditions and/or processes: resource allocation, data contention, I/O delays and/or errors, I/O waiting and/or queuing, I/O timeouts, locking (e.g., excessive locking), system instability, central processing unit (CPU) overhead, and/or the like.

The I/O path 210 may be implemented with any number and/or types of connections including one or more interconnects and/or protocols such as Peripheral Component Interconnect Express (PCIe), Compute Express Link (CXL), Advanced eXtensible Interface (AXI), and/or the like, one or more storage connections and/or protocols such as Serial ATA (SATA), Serial Attached SCSI (SAS), Non-Volatile Memory Express (NVMe), and/or the like, one or more network connections and/or protocols such as Ethernet, Fibre Channel, InfiniBand, and/or the like, as well as combinations thereof such as NVMe over Fabric (NVMe-oF), and/or the like.

The storage layer 208 may be implemented with any number and/or types of storage apparatus such as solid state drives (SSDs), hard disk drives (HDDs), optical drives, drives based on any type of persistent memory such as cross-gridded nonvolatile memory with bulk resistance change, and/or the like, and/or any combination thereof. Such apparatus may be implemented in any forms and/or configurations, for example, as storage devices having form factors such as 3.5 inch, 2.5 inch, 1.8 inch, M.2, and/or the like, and/or using any connector configurations such as SATA, SAS, U.2, and/or the like. Some embodiments may be implemented entirely or partially with and/or within a server chassis, server rack, data room, datacenter, edge datacenter, mobile edge datacenter, and/or any combinations thereof, and/or the like.

In some embodiments, the combination of the application server layer 204 and the storage layer 206 may implement a datacenter. Thus, depending on the implementation details, the application server layer 204 and the storage layer 206 may be considered a near-field arrangement, while client cloud layer 202 and application server layer 204 may be considered a far-field arrangement.

The embodiment illustrated in FIG. 2 may further include one or more partition manager applications 212 which may interface, for example, between the client cloud layer 202 and application server layer 204 and/or between the application server layer 204 and the storage layer 206. In some embodiments, the partition manager applications may determine how to allocate one or more tiers of storage resources (e.g., a top-tier of storage resources) in the storage layer 206 to different clients (e.g., cloud clients 203) and/or and their applications.

Although the principles of this disclosure are not limited to any particular implementation details, for purposes of illustration, some example embodiments may be implemented as follows. A client cloud layer 202 may be connected to an application server layer 204 through one or more LANs, MANs, or WANs, implemented with multi-Gb Ethernet connections (e.g., 10 Gb/25 Gb/40 Gb/100 Gb Ethernet). An application server layer 204 may employ one or more PCIe interconnects which, using PCIe Generation 4 (PCIe Gen 4), may deliver more than 8 GB/sec of throughput. An application server layer 204 may be connected to a storage layer 206 using one or more NVMe-oF connections through which, for example, an NVMe storage device may deliver millions of input and/or output operations per second (IOPS). Depending on the implementation details, such embodiments may reduce or eliminate bandwidth limitations and/or bottlenecks.

2.2 Software I/O Path Architecture

Figure 3:
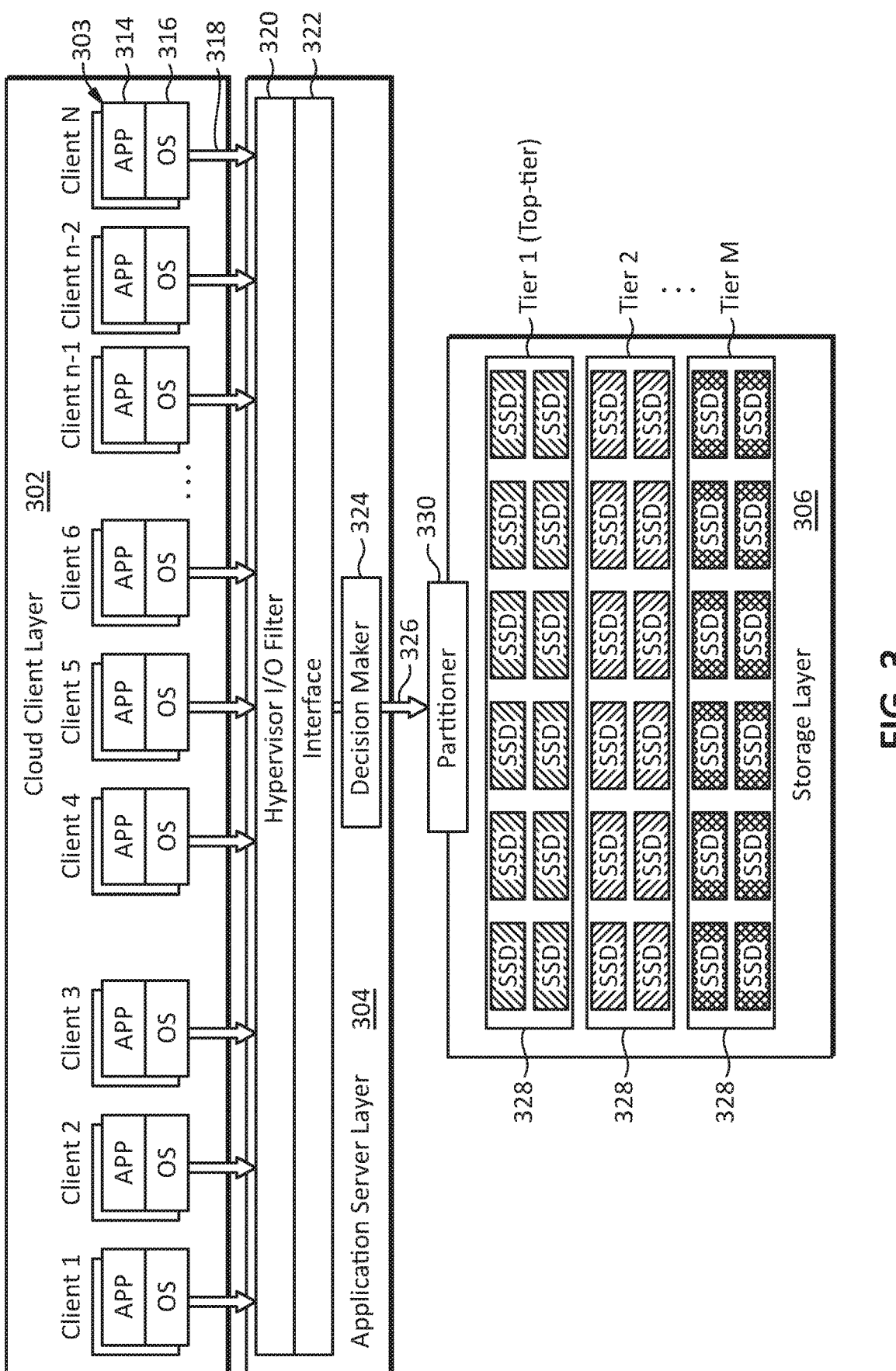
FIG. 3 illustrates an embodiment of a storage system software architecture in accordance with example embodiments of the disclosure.

FIG. 3 illustrates an embodiment of a storage system software architecture in accordance with example embodiments of the disclosure. The software architecture illustrated in FIG. 3 may be used, for example, with the storage system architecture illustrated in FIG. 2, but it may be used with other systems as well. The embodiment illustrated in FIG. 3 may include a cloud client layer (CCL) 302, an application server layer (ASL) 304, and a storage layer (BSL) 306.

In some embodiments, the client cloud layer 302 may include one or more clients 303, each of which may run one or more operating system (OS) 316 and one or more applications (APP) 314. In this example, there may be N clients: Client 1, Client 2, . . . Client N. In some embodiments, clients 303 may be modeled as operating systems 316 and/or applications 314. Depending on the implementation details, a client 303 may have one or more operating systems 316 and/or applications 314. Moreover, each operating system 316 may host any number of applications 314.

Depending on the implementation details, some or all of the clients may be isolated from each other. Examples of clients may include any of the individual clients 203 illustrated in FIG. 2, as well as one or more virtual machines (VMs) that, for example, may be rented to a user from a cloud service vendor. Depending on the implementation details, clients 303 such as VMs may have different workload characteristics based, for example, on user applications, and thus they may have different levels of sensitivity to storage I/O speeds.

Each client 303 (which may also be referred to as a storage client) may be connected to the application storage layer 304 through a network connection 318 which may be implemented, for example, using any number and/or types of networks connections such as those described above with reference to FIG. 2. For VMs, a network connection may be implemented as a virtual network connection.

The application server layer 304 may include an I/O filter 320, a partition manager interface 322, and a partition decision maker 324. In some embodiments, the I/O filter 320 may be implemented with, or as part of, one or more hypervisors which may also be used, for example, to implement client VMs. The I/O filter 320 may collect I/O related statistics for the clients and provide these statistics to the partition decision maker 324. In embodiments that include a hypervisor, one or more VMs may be hosted using hypervisor software which may have a built in I/O filter function (e.g., "IOFilter( )") that may be used to handle I/O requests and/or collect I/O statistics. For purposes of illustration, the I/O filter 320 in the embodiment illustrated in FIG. 3 may be shown as a hypervisor, but other types of I/O filters may be used.

In some embodiments, the partition manager interface 322 may provide a standard I/O interface for one or more of the clients 303. Depending on the implementation details, the partition manager interface 322 may provide operations for file-based systems, key-value object storage systems, and/or any other type of storage system and/or combinations thereof, as described in more detail below. The partition manager interface 322 may interface with the storage layer 306 through an I/O path 326 that may be implemented using any number and/or types of connections such as those described with reference to the I/O path 210 illustrated in FIG. 2.

The partition decision maker 324 may make decisions at various times, for example, at periodic intervals, to trigger re-partitioning of one or more tiers of the storage layer 306. Re-partitioning may be based, for example, on predicted client performance if one or more clients are migrated to other tiers as well corresponding migration overhead.

The storage layer 306 may operate one or more tiers 328 of storage devices arranged, for example, as a pool of storage resources that may be allocated between different clients. In this example there may be M tiers: Tier 1, Tier 2, . . . Tier M. In some embodiments, different tiers may have different characteristics, for example, for tradeoffs between access speed, capacity, and/or the like. In the embodiment illustrated in FIG. 3, all of the storage devices may be illustrated as various types of SSDs, but any type and/or configuration of storage resources may be used.

The storage layer 306 may also include a partitioner 330 which, based on a partition decision from the partition decision maker 324, may perform a re-partition operation and/or trigger one or more content updates between the tiers 328 (e.g., between the top-tier (Tier 1) and the second tier (Tier 2). In some embodiments, a partitioner 330 of a partition manager system in accordance with example embodiments of the disclosure may adjust the allocation of partitions of one or more tiers 328 (e.g., a top-tier) in the storage pool for each client 303. Each of the clients 303 may access the one or more corresponding partitions of one or more tiers 328 allocated by the partitioner 330.

Although some of the components illustrated in FIG. 3 may be shown as individual components associated with other specific components, in other embodiments, components may be combined, split apart, and/or associated with other components. For example, in some embodiments, the partition decision maker 324 and partitioner 330 may be combined in a single component located in the application server layer 304, the storage layer 306, and/or some other location.

The partition manager interface 322 may enable a partition manager system in accordance with example embodiments of the disclosure to provide one or more interfaces and/or functions to clients 303, for example, through an application programming interface (API).

When an I/O request from a client arrives at the application server layer 304, the hypervisor I/O filter (HIF) 320 may differentiate each I/O stream and conduct a statistical analysis such as determining a workload change and/or top-tier storage device cache hit ratio. The I/O request may then proceed to the partition manager interface 322 which may provide a standard I/O interface for various clients.

Algorithm 1 illustrates some example operations of an embodiment of an interface that may provide file-oriented storage operations on the storage layer 306 for a client 303 in accordance with example embodiments of the disclosure. When one of the functions illustrated in Algorithm 1 is invoked, the return type provided by the algorithm may be indicted by the "=>" symbol.

Figure 4:
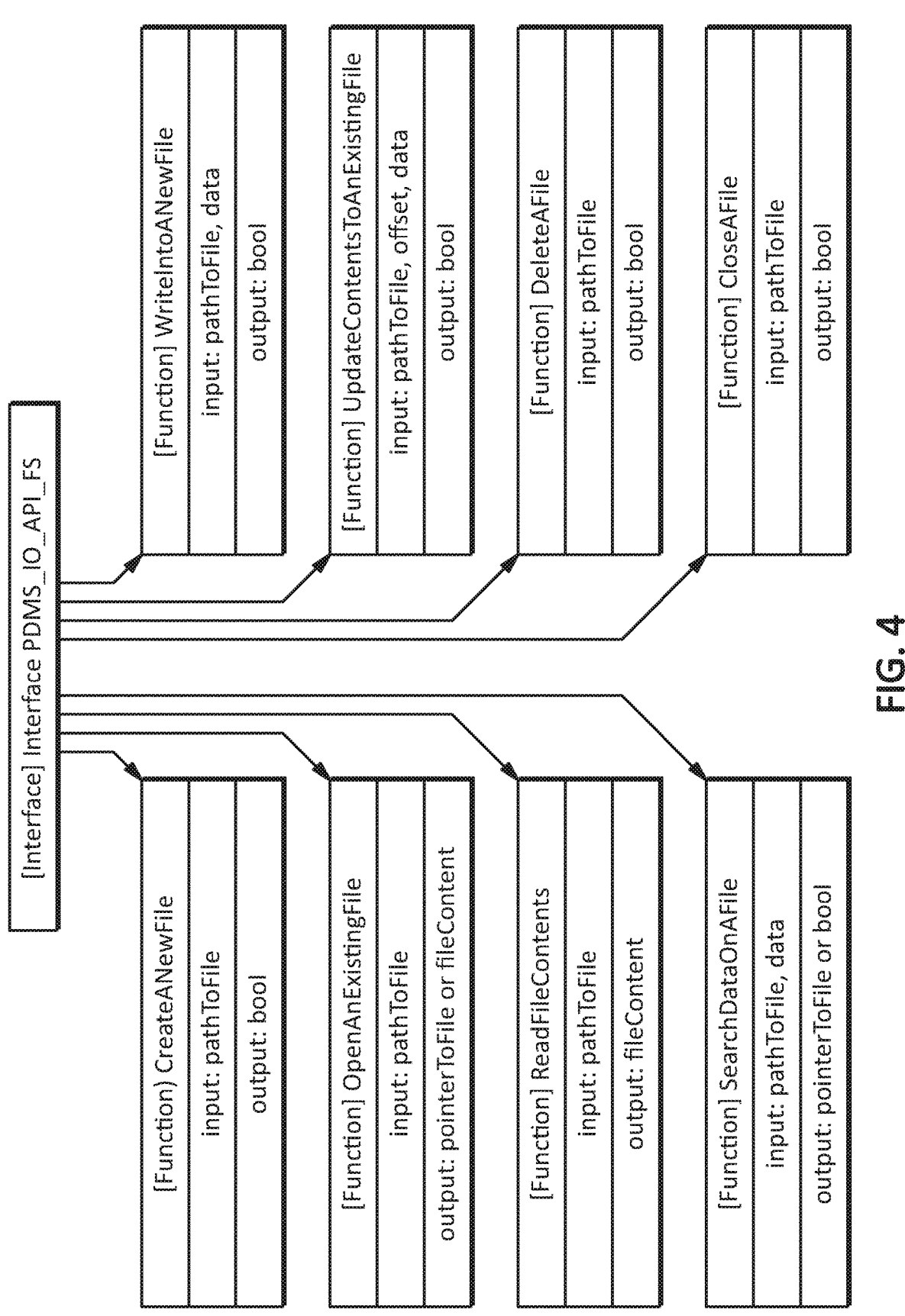
FIG. 4 illustrates example embodiments of inputs and outputs for an interface for file-oriented storage operations in accordance with example embodiments of the disclosure.

FIG. 4 illustrates example embodiments of inputs and outputs for an interface for file-oriented storage operations in accordance with example embodiments of the disclosure. The embodiment illustrated in FIG. 4 may be used, for example, with the embodiment illustrated in Algorithm 1. Each of the functions illustrated in FIG. 4 may be invoked with the corresponding input. The function may then respond with the corresponding output as shown in FIG. 4.

---

Algorithm 1

```
1   # File-oriented Storage
2   Interface PDMS_IO_API_FS:
3       Function CreateANewFile(pathToFile) => bool
4       Function OpenAnExistingFile(pathToFile) => pointerToFile or
        fileContent
```

-continued

| Algorithm 1 |
| --- |

```
5    Function ReadFileContents(pathToFile) => fileContent
6    Function SearchDataOnAFile(pathToFile, data) => pointerToFile
     or bool
7    Function WriteIntoANewFile(pathToFile, data) => bool
8    Function UpdateContentsToAnExistingFile(pathToFile, offset,
     data) => bool
9    Function DeleteAFile(pathToFile) => bool
10   Function CloseAFile(pathToFile) => bool
```

Algorithm 2 illustrates some example operations of an embodiment of an interface that may provide object-oriented storage operations on the storage layer 306 for a client 303 in accordance with example embodiments of the disclosure. When one of the functions illustrated in Algorithm 1 is invoked, the return type provided by the algorithm may be indicted by the "=>" symbol.

| Algorithm 2 |
| --- |

```
1    # Object-oriented Storage
2    Interface PDMS_IO_API_OBJ:
3        Function CreateANewObject(key, value) => bool
4        Function OpenAnExistingObject(key) => key or value
5        Function ReadObjectContents(key) => value
6        Function SearchDataOnAObject(key, value) => <key, value> or
             <key, value, offset> or bool
7        Function WriteIntoANewObject(key, value) => bool
8        Function UpdateContentsToAnExistingObject(key, offset,
             value) => bool
9        Function DeleteAObject(key) => bool
10       Function CloseAObject(key) => bool
```

Figure 5:
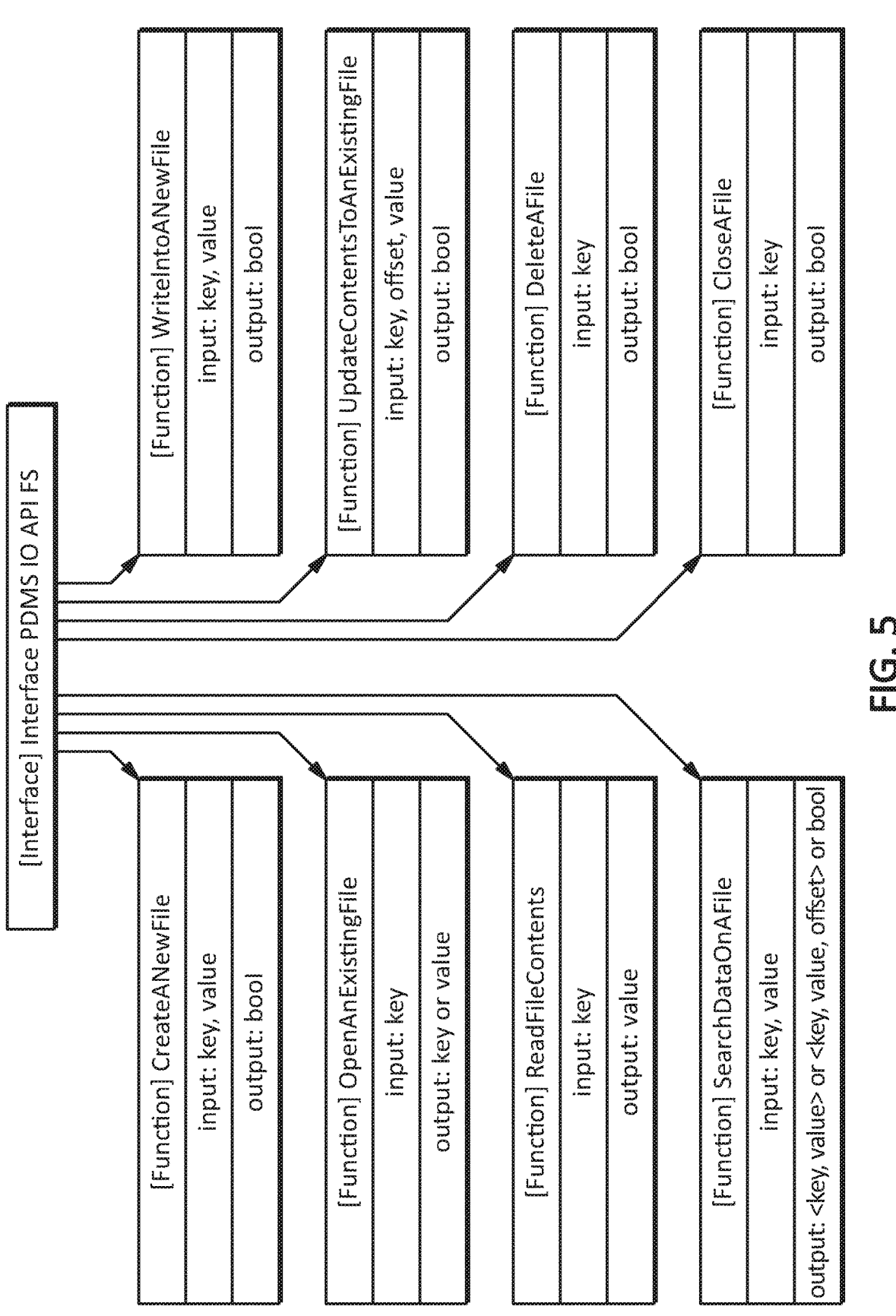
FIG. 5 illustrates example embodiments of inputs and outputs for an interface for object-oriented storage operations in accordance with example embodiments of the disclosure.

FIG. 5 illustrates example embodiments of inputs and outputs for an interface for object-oriented storage operations in accordance with example embodiments of the disclosure. The embodiment illustrated in FIG. 5 may be used, for example, with the embodiment illustrated in Algorithm 2. Each of the functions illustrated in FIG. 5 may be invoked with the corresponding input. The function may then respond with the corresponding output as shown in FIG. 5.

In the file-oriented embodiments illustrated in Algorithm 1 and FIG. 4, the interface may operate on a file (which may be pointed to by a path to the file). In the object-oriented embodiments illustrated in Algorithm 2 and FIG. 5, the interface may operate on key-value pairs (which may be pointed to by a key).

In some embodiments, a partition manager system in accordance with example embodiments of the disclosure may adapt different storage systems based, for example, on client requests. Moreover, depending on the implementation details, the adaptation process may be transparent to the cloud client layer 302 and/or the storage layer 306. In some embodiments, the partition manager interface 322 may be extended to support additional I/O storage types, for example, customized I/O storage types, based on client demand for the additional storage types.

After an I/O request passes through the partition manager interface 322, the partition decision maker 324 may analyze the behavior of each client's applications and corresponding feedback from one or more of the storage tiers 328 (e.g., from the top-tier which may operate as a storage cache). In some embodiments, the partition decision maker 324 may use this analysis and feedback to adjust each client's partition of the top-tier (Tier 1), for example, to improve or optimize the overall performance of the entire storage system and/or ensure fairness based on factors such as quality-of-service (QoS) and/or the actual workload behavior for each client. The partition decision maker 324 may periodically and/or dynamically adjust the storage partition size of one or more of the tiers 328 (e.g., the top-tier which may be the highest performance tier) for each client based on runtime workload analysis results.

In some embodiments having two or more tiers of storage devices, the algorithms and/or operations described herein may be implemented between multiple pairs of tiers, for example, between Tier 1 and Tier 2, between Tier 2 and Tier 3, between Tier 1 and Tier 3, and/or the like.

Table 1 illustrates some example implementation details of an example embodiment of an all SSD storage layer 306 in accordance with example embodiments of the disclosure. Each tier may be implemented with a different type of storage device that may different characteristics suitable for that tier. The details illustrated in Table 1 may be used, for example, with the embodiment of a storage layer 306 illustrated in FIG. 3.

In some embodiments, some example values, parameters, and/or the like may be provided for purposes of illustrating the principles, but the principles are not limited to these examples, and other values, parameters, and/or the like may be used.

TABLE 1

| Tier ID | Storage Device | Characteristic | Read Latency (µs) | Write Latency (µs) |
| --- | --- | --- | --- | --- |
| Tier 1 | Cross-grid, bulk resistance change | Very High performance | 10 µs | 10 µs |
| Tier 2 | SLC NVMe SSD | High performance | 25 µs | 200 µs |
| Tier 3 | MLC NVMe SSD | Middle performance | 50 µs | 1400 µs |
| Tier 4 | TLC NVMe SSD | Large capacity | 250 µs | 2700 µs |
| Tier 5 | QLC NVMe SSD | Large capacity | 283 µs | 3000 µs |

Referring to Table 1, Tier 1 may be implemented with storage devices based on persistent memory such as cross-gridded nonvolatile memory with bulk resistance change which may provide very high performance. Tier 1 may operate, for example, as a storage cache for one or more of the other tiers. Tier 2 may be implemented with single-level cell (SLC) NVMe SSDs which may provide high performance but not as high as Tier 1. Tier 3 may be implemented with multi-level cell (MLC) NVMe SSDs which may provide middle-level performance. Tiers 4 and 5 may be implemented with triple-level cell (TLC) and quad-level cell (QLC) NVMe SSDs, respectively, which may provide successively lower performance but higher capacity. Such an embodiment may be used, for example, for cloud computing applications. A partition manager system in accordance with example embodiments of the disclosure may adjust periodically and/or dynamically adjust each client's partition, for example, in the top-tier which may operate as a storage cache for a storage system such as a disaggregated storage system. In some embodiments, a partition manager system in accordance with example embodiments of the disclosure may apply similar adjustment methods, for example, between Tier 2 and Tier 3, where Tier 2 may operate as a cache tier for Tier 3, and so on.

Figure 6:
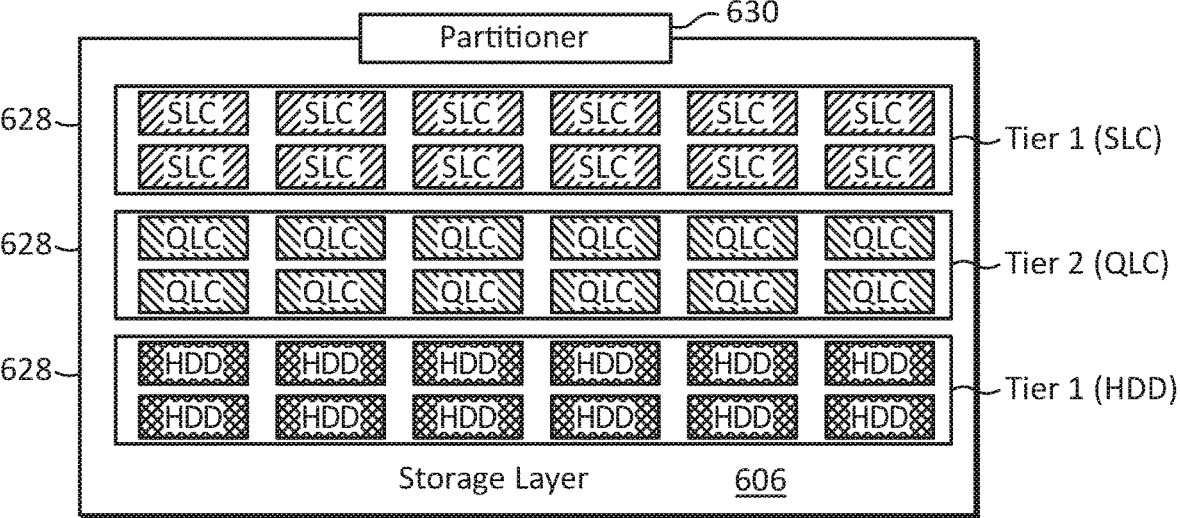
FIG. 6 illustrates an example embodiment of a storage layer in accordance with example embodiments of the disclosure.

FIG. 6 illustrates an example embodiment of a storage layer in accordance with example embodiments of the disclosure. In the embodiment illustrated in FIG. 6, the storage layer 606 may be implemented tiers 628 having a combination of SSDs and HDDs. Table 2 illustrates some example implementation details that may be used, for example, with the storage layer 606 illustrated in FIG. 6.

TABLE 2

| Tier ID | Type | Usage example | Granularity degree | Granularity example |
|---|---|---|---|---|
| Tier 1 | SLC | Caching game runtime data and part of hot game image (hot files) | Fine | File or block |
| Tier 2 | QLC | Hot game images (entire game). | Coarse | Game Image |
| Tier 3 | HDD | All game images (entire game). | Coarse | Game Image |

Referring to Table 2, Tier 1 may be implemented with SLC NVMe SSDs which may provide a very high level of performance and a relatively fine level of granularity. Tier 1 may operate, for example, as a storage cache for one or more of the other tiers. Tier 2 may be implemented with QLC NVMe SSDs which may provide a relatively high level of performance and a relatively coarse level of granularity. Tier 3 may be implemented with HDDs which may provide a relatively lower level of performance and relatively coarse granularity, but at a relatively low cost.

The embodiment illustrated in FIG. 6 and Table 2 may be used, for example, for an online game streaming service datacenter. The top-tier (Tier 1) may be used to cache runtime game data such as a runtime instance of the game, metadata, the status of gameplay, all or part of a hot game image (e.g., hot files), and/or the like. Some embodiments may use a delta differential storage approach to further save space. The second tier (Tier 2) may have a combination of relatively high performance and relatively large capacity to cache hot game images. Thus, Tier 2 may operate as a cache for Tier 3. The third tier (Tier 3) may have a large capacity and may be used as a storehouse for game images (e.g., all game images).

2.3 Workflow Architecture

Figure 7:
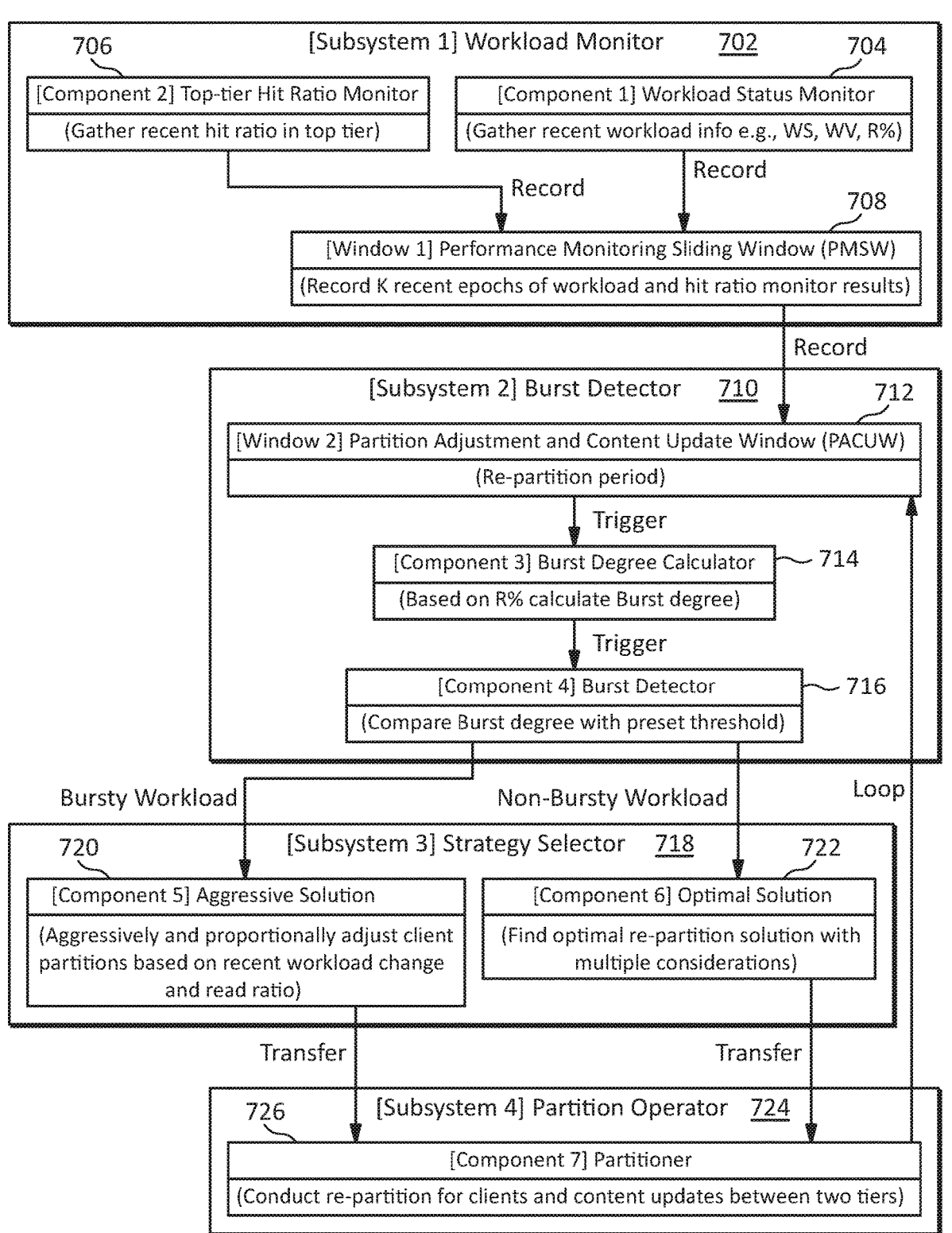
FIG. 7 illustrates an example embodiment of a workflow architecture for a partition manager system in accordance with example embodiments of the disclosure.

FIG. 7 illustrates an example embodiment of a workflow architecture for a partition manager system in accordance with example embodiments of the disclosure. The embodiment illustrated in FIG. 7 may be used, for example, on, with, in conjunction with, and/or the like, any of the embodiments disclosed herein, including the embodiments illustrated in FIGS. 1-6. For purposes of illustration, the embodiment illustrated in FIG. 7 may be described in the context of a system having a storage layer with a top-tier that may operate as a storage cache for one or more other tiers. However, the principles may be applied to any other configuration of tiers and/or caches.

The embodiment illustrated in FIG. 7 may include a workload monitor subsystem (Subsystem 1) 702, a burst detector subsystem (Subsystem 2) 710, a strategy selector subsystem (Subsystem 3) 718, and a partition operator subsystem (Subsystem 4) 724. The workload monitor subsystem 702 may include a workload status monitor (Component 1) 704 and a hit ratio monitor component (Component 2) 706. The burst detector subsystem 710 may include a burst degree calculator (Component 3) 714 and a burst detector (Component 4) 716. The strategy selector subsystem 718 may include an aggressive solution component (Component 5) 720 and an optimal solution component (Component 6) 722. The partition operator subsystem 724 may include a partitioner component (Component 7) 726.

The workflow illustrated in FIG. 7 may operate in an overall loop to periodically and/or dynamically adjust each client's storage partition size in one or more tiers of a storage layer. For example, the workflow may adjust each client's storage partition size in a top-tier (e.g., the highest performance tier in some implementations) based on runtime workload analysis results.

Figure 8:
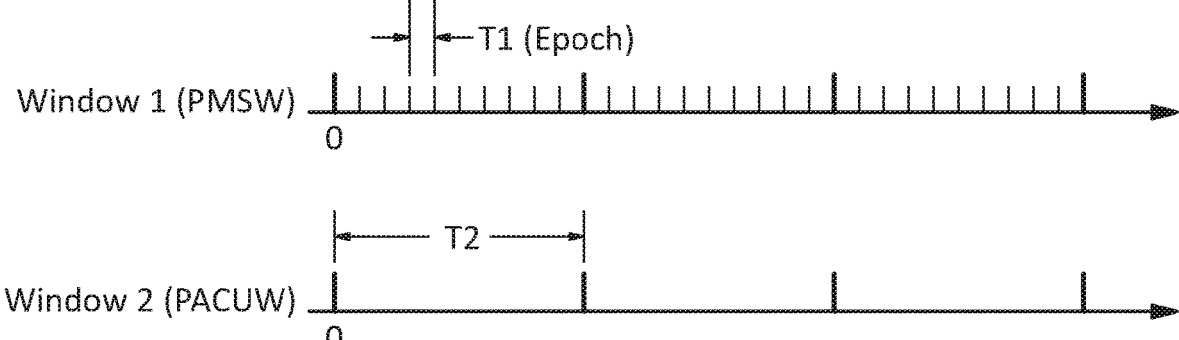
FIG. 8 illustrates example embodiments of temporal windows for a workflow for a partition manager system in accordance with example embodiments of the disclosure.

In some embodiments, the workflow illustrated in FIG. 7 may operate on two temporal windows running in parallel in a storage system. FIG. 8 illustrates example embodiments of temporal windows for a workflow for a partition manager system in accordance with example embodiments of the disclosure. As illustrated in FIG. 8, a first window (Window 1) may operate on relatively short cycles during which the workflow may monitor workload behaviors and/or cache status information collected by the workload monitor subsystem 702.

In some embodiments, Window 1 may be implemented as a performance monitoring sliding window (PMSW) 708 in which workflow and/or cache status data may be sampled, collected, processed and/or the like over an epoch that may move with time. In some example implementations, Window 1 may have an epoch length T1 of about 5 minutes, although any other period of time may be used. In some embodiments, Window 1 may set a frequency at which the burst detector subsystem 710 may record workflow and/or cache status (e.g., to tier hit ratio) data collected by the workload monitor subsystem 702. Examples of workload behaviors that may be used by the burst detector subsystem 710 may include working set (WS) size in the most recent epoch, working volume (WV) size in the most recent epoch, read ratio (R) in the most recent epoch, and/or the like, which may be described in more detail below. In some embodiments, a partition manager system in accordance with example embodiments of the disclosure may retain workflow and/or cache status data for the k most recent continuous or discrete epochs, where k may be any number. In some example implementations, k may be 10. In some embodiments, an exponential moving average window (EMAW) technique may be applied to the data for the k epochs.

In some embodiments, Window 2 may be implemented as a partition adjustment and content update window (PACUW) 712. Window 2 may determine a re-partition period at which a new re-partition evaluation may be triggered. At a re-partition boundary, the burst degree calculator component 714 may be triggered by Window 2 to determine an approach for calculation of a burst degree (Bd), which may indicate an impending I/O burst based on the read ratio (R) which may be described in more detail below. In some embodiments, Window 2 may have a window length T2 that may be larger than one epoch of Window 1. For example, T2 may be about one hour, although any other period of time may be used. In some embodiments, implementing Window 2 longer than Window 1 may reduce the cost of operating a partition manager system because, depending on the implementation details, re-partitioning may be relatively expensive in terms of bandwidth, power consumption, and/or the like. In some embodiments, the relative lengths of Window 1 (T1) and Window 2 (T2) may be selected to balance the tradeoff between performance and overhead. For example, re-partitioning more frequently may provide improved performance, but depending on the implementation details, the improved performance may be outweighed by the increase in overhead associated with re-partitioning. Between re-partitionings, the burst detector subsystem 710 may continue receiving working set size (WS), working volume size (WV), read ratio (R), and/or other data that may be gathered by the workload monitor subsystem 702 during Window 1 epochs.

Table 3 lists some example embodiments of various aspects related to a workflow for a partition manager system in accordance with example embodiments of the disclosure. Table 3 lists each aspect along with a corresponding symbol and a corresponding code symbol that may be used, for example, in one or more algorithms disclosed herein. In some embodiments, the aspects listed in Table 3 may be described as follows.

Working volume size |V| may indicate the total amount of data (e.g., in bytes) accessed on a storage device or other unit of storage resource. In memory-related contexts (e.g., dynamic random access memory (DRAM)), working volume size may be referred to as a footprint.

Working set size |S| may indicate a total address range (e.g., in bytes) of accessed data, which may be, for example, a set of working addresses for a working volume. In some embodiments, a large working set may cover more storage space. If the cache size is larger than or equal to the working set size for a workload, the I/O hit ratio of the workload may be equal or close to 100 percent, for example, using a least recently used (LRU) caching algorithm.

Read ratio R may be determined, for example, by a read working volume by a total working volume, where the total working volume may be determined by the sum of the read working volume and the write working volume. In some embodiments, the range of the read ratio may be zero to one-hundred percent [0%, 100%] where a higher read ratio may indicate a more read-intensive workload.

Window 1 $W_1$ (e.g., the length of the PMSW) may indicate the epoch length T1 during which workload behaviors and/or cache status information may be recorded before beginning a monitoring cycle.

Window 2 $|W_2|$ (e.g., the length of the PACUW) may indicate the period T2 of re-partition. This window may trigger an entire re-partition operation workflow from the burst detector subsystem 710, through the strategy selector subsystem 718, and to the partition operator subsystem 724.

TABLE 3

| Aspect | Code Symbol | Symbol |
|---|---|---|
| Working Volume Size | WV | |V| |
| Working Set Size | WS | |S| |
| Read Ratio | R | R |
| Epoch for PMSW | $W_1$ | $W_1$ |
| PACUW | $W_2$ | $W_2$ |

Referring again to FIG. 7, at intervals that may be determined by Window 2, the burst detector subsystem 710 may calculate a burst degree based, for example, on a recently determined different read ratio (R). (In some embodiments, a burst may also be referred to as a spike.) The burst degree calculation may be performed, for example, by the burst degree calculator 714. For read-intensive workloads (as determined, for example, based on the read ratio (R), the burst degree may be calculated based on a working set (WS) size change. For non-read-intensive workloads, the burst degree may be calculated based on a working volume (WV) and/or footprint size change.

After the burst degree calculator 714 determines the burst degree, it may transfer this information to the burst detector 716, which may compare the burst degree to a preset threshold to determine whether the current workload may be characterized as bursty or non-bursty. The bursty/non-bursty determination may be used to determine which type of re-partitioning strategy to use in the strategy selector subsystem 718.

If the current workload is bursty, the workflow illustrated in FIG. 7 may invoke the aggressive solution component 720 to apply an aggressive re-partitioning strategy which may adjust the top-tier partition for each client proportionally, for example, based on demands during one or more recent PMSW epochs. For example, an aggressive approach may adjust the partition of each client based on its recent working set size change (for read-intensive workloads) or working volume size change (for non-read-intensive workloads). In some embodiments, an aggressive strategy may be implemented relatively quickly, which may enable the system to react quickly to accommodate an impending expected I/O burst.

However, if the current workload is non-bursty, the system may have sufficient time to apply an optimization framework using the optimal solution component 722, which may strive to find a global best partition solution, for example, to best utilize the top-tier (e.g., cache tier) by solving, improving and/or maximize an objective function as described below. Thus, for a non-bursty workload, the optimal solution component 722 may be selected to apply a re-partitioning strategy based on an optimization framework which may consider different factors relating to all of the hosting clients such as the workload change in one or more recent PMSW epochs, the estimated hit ratio if the partition size is increased or decreased, the weight of each client based, for example, on quality-of-service (QoS) and/or service level agreements (SLAs), and/or the like.

The partitioner component 726 may conduct the actual re-partitioning operation, for example, on a top-tier of a storage level, based on the resulting partition strategy provided by the strategy selector subsystem 718. The workflow illustrated in FIG. 7 may then loop back to waiting for the next re-partitioning operation to be triggered by Window 2 in the burst detector subsystem 710.

3. Burst Detection

A burst detector subsystem 710 in accordance with example embodiments of the disclosure may detect whether the current workload of a storage layer may be bursty or non-bursty to enable a strategy selector subsystem 718 to select the re-partitioning strategy base on a burst degree, since a higher burst degree may allow less time to react, and vice versa. In some embodiments, a burst (which may also be referred to as a spike) may be characterized by a relatively high number of I/O accesses on a relatively large amount of data that may occur within a relatively short period of time.

In some embodiments, a burst detection operation may take into consideration the I/O patterns of all or most clients, for example, all I/O client accesses of the storage layer in one or more recent PMSW epochs, to determine which strategy to use for re-partitioning. In some other embodiments, however, a burst status determination may focus on a relatively small number of clients (e.g., on a per client basis).

In some embodiments, a burst degree calculation may involve different approaches based on the read ratio (R) of recent access of all or most clients to the top-tier storage. For example, a preset read ratio threshold e may be used to determine whether a recent workload is read-intensive or non-read-intensive. For purposes of illustration, e may be set to 95 percent in some example embodiments disclosed herein. However, in other implementations, e may be set to any suitable value for determining a threshold for a read-intensive workload, for example, in the range of [0%, 100%].

In some embodiments, if the read ratio is in the range [0, e), the workload may be classified as non-read-intensive. In this case, a change in the size of the working volume may be used to calculate the burst degree. In some embodiments, the working volume change (which may also be referred to as a footprint), may include the entire record of all touched addresses. For non-read-intensive workloads, the working volume may be used to calculate the burst degree because, if there are a relatively large number of write I/Os, each new write request may be assigned to a new slot, and repeated write requests for the same address may also be assigned new slots in the cache. Thus, the burst degree calculation may be based on the change in the working volume size.

FIG. 9 illustrates an example embodiment of I/O requests for a non-read-intensive workload in accordance with example embodiments of the disclosure. In the embodiment illustrated in FIG. 9, a top-tier (e.g., storage cache) 902 may be shown at times T0 through T5. The table 904 may indicate the read or write operation performed on the data chunks A, B, C, and D at each time and the amount of data in each chunk. Letters may indicate the chunks of data, and letters with tick marks (e.g., C') may indicate updated data. At times T0-T3, data A, B, C, and D may be written to the top-tier 902. At time T4, the two A chunks and two of the B chunks may be evicted and overwritten by the C' data. At time T5, one of the D chunks may be read from the top-tier 902. Thus, the storage system may assign new slots for each new write request, and repeated write requests of the same address may also be assigned new slots in the cache (e.g., the four new chunks of data C at time T4). Thus, the system may base the burst degree calculation on the change in the size of the working volume of the workload.

Algorithm 3 illustrates some example operations of an embodiment of a burst degree calculation in accordance with example embodiments of the disclosure. Algorithm 3 may be performed, for example, by the burst degree calculator component 714 (Component 3 of Subsystem 2) illustrated in FIG. 7. In the embodiment illustrated in Algorithm 3, code for the parameter selection for a non-read-intensive case may be located at lines 4-7.

| Algorithm 3 |
| --- |
| 1    Subsystem_2_Burst_Detector: |
| 2       Component_3_Burst_Degree_Cacluator: |
| 3         preset threshold e=95% |
| 4         Function calBurst( ): |
| 5           if writePercentage in [0, e): |
| 6             # non-read-intensive workload |
| 7             burstDegree=calBurst(curWV, preWV) |
| 8           else if readRatio in [e, 1]: |
| 9             # read-intensive workload |
| 10             burstDegree=calBurst (curWS, prewS) |
| 11         Function calBurst(cur, pre): |
| 12           return |cur-pre|/|cur| |
| 13       Component_4_Burst_Detector: |
| 14         preset threshold bt=0.5 |
| 15         Function burstFlag( ): |
| 16           if burstDegree>0.5: |
| 17             return True |
| 18           else: |
| 19             return False |

In some embodiments, if the read ratio is in the range [e, 1], the workload may be classified as read-intensive. In this case, a change in the size of the working set may be used to calculate the burst degree. In some embodiments, the working set may be characterized as a deduplicated version of the working volume.

Figure 10:
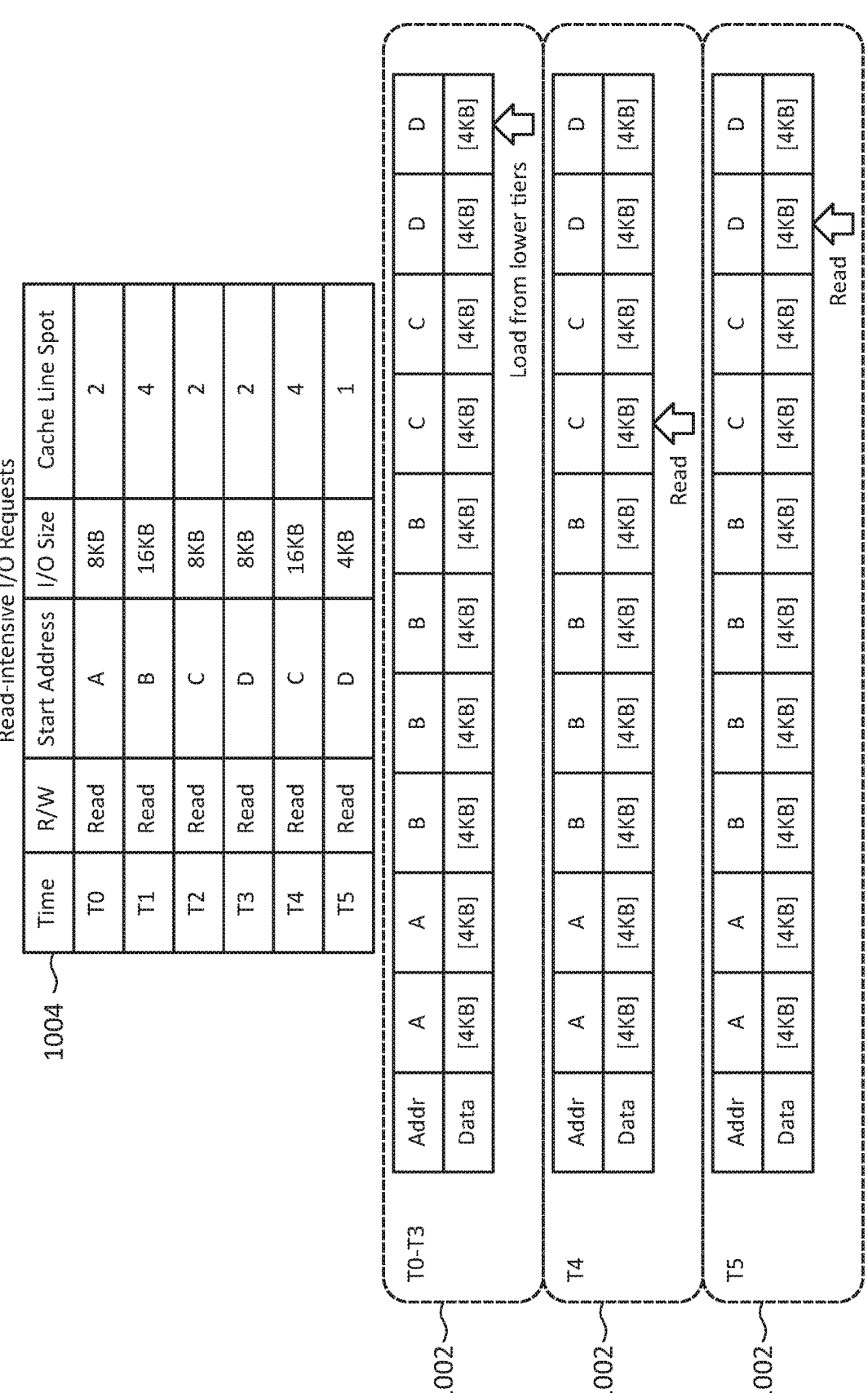
FIG. 10 illustrates an example embodiment of a mixed read and write workload in accordance with example embodiments of the disclosure.

FIG. 10 illustrates an example embodiment of I/O requests for a read-intensive workload in accordance with example embodiments of the disclosure. In the embodiment illustrated in FIG. 10, a top-tier (e.g., storage cache) 1002 may be shown at times T0 through T5. The table 1004 may indicate the read or write operation performed on the data chunks A, B, C, and D at each time and the amount of data in each chunk. At times T0-T3, data chunks A, B, C, and D may be read from the top-tier 1002. At time T4, data chunk C may be read again. At time T5, data chunk D may be read again. As illustrated in FIG. 10, with a read-intensive workload, the system may not assign a new slot for repeated I/O requests if the requested I/O content has already been cached in the top tier 1002 (and is still present in the cache). Thus, the system may base the burst degree calculation on the change in the size of the working set of the workload (e.g., the unique addresses that have been touched).

In the embodiment illustrated in Algorithm 3, code for the parameter selection for a read-intensive case may be located at lines 8-10.

Once the parameter (e.g., working volume size or working set size) has been selected to use for the burst calculation, it may be used to calculate the burst degree. In some embodiments, a piecewise function may be used to calculate the burst degree, for example, as shown in Eq. 1. Some of the symbols used in Eq. 1 may be characterized as follows.

$|V_{curwin}|$ may represent the working volume size of the current PMSW epoch.

$|V_{prevwin}|$ may represent the working volume size of the previous PMSW epoch.

$|S_{curwin}|$ may represent the working set size of the current PMSW epoch.

$|S_{prevwin}|$ may represent the working set size of the previous PMSW epoch.

The delta function may be used to track changes in the working set $(\Delta(S_{curwin}, S_{prevwin}))$ or working volume sizes $(\Delta(V_{curwin}, V_{prevwin}))$ between the current and previous PMSW windows. (In some embodiments, the same method may be used to consider more than two PMSW windows to calculate burst degree.) The relative difference between the two PMSW windows may then be calculated as the burst degree Bd as follows:

$$B_d = \begin{cases} \Delta(V_{curwin}, V_{prevwin}) = \dfrac{||V_{curwin}| - |V_{prevwin}||}{|V_{curwin}|}, & \text{if } R \in [0, e) \\ \Delta(S_{curwin}, S_{prevwin}) = \dfrac{||S_{curwin}| - |S_{prevwin}||}{|S_{curwin}|}, & \text{if } R \in [e,) \end{cases} \qquad \text{Eq. 1}$$

The calculated value of Bd may then be compared to the predefined burst threshold Bt. If the Bd>Bt, it may indicate that the current workload may be characterized as bursty. The value of Bt may preset to any suitable value, for example, in the range of 40 to 60 percent. In some embodiments, setting the value of Bt to 50 percent may ensure that the beginning (ascending edge) and ending (descending edge) of a burst may be captured. For example, if Bt is set to 50 percent, it may indicate that if a change of more than 50 percent of the working volume size change (for non-read-intensive case) or working set size change (for read-intensive case) is detected, the workload is determined to be bursty.

In some embodiments, some conditional relationships and supporting considerations for a burst degree calculator component such as Component 3 illustrated in FIG. 7 may be as follows. For a read-intensive workload, the burst degree calculation may be based on a change in the working set size of the current workload. For read-intensive workloads, the storage system may not assign a new slot in a top-tier (e.g., a storage cache) for repeated I/O requests if the requested I/O content has already been cached in the cache (and is still in the cache). Thus, the burst degree calculation may be based on a change in the working set (which may include unique addresses that have been touched).

For non-read-intensive workloads, the burst degree calculation may be based on a change in the working volume size of the current workload. If the workload includes a relatively large number of write I/Os, new slots may be assigned in a top tier for each new write request, and repeated write requests of the same address may also be assigned new slots in the cache. Thus, the burst degree calculation may be based on a change in the working volume of the workload. In some embodiments, the working volume may be a footprint which may include the entire record of all touched addresses. Thus, a working set may be characterized as a deduplicated version of the working volume.

In some embodiments, some conditional relationships and supporting considerations for a burst detector component such as Component 4 illustrated in FIG. 7 may be as follows. For a bursty workload, solving an optimization framework may take more time than may be available before a burst arrives. Therefore, an aggressive approach may be applied to a re-partitioning operation. In some embodiments, an aggressive approach may adjust the partition of each client based on a recent change in its working set size (for a read-intensive workload) or working volume (for a non-read-intensive workload). For a non-bursty workload, a partition manager system may have sufficient time to solve an optimization framework. Therefore, an optimized approach, which may strive to find a global best partition solution to achieve the best objective function, may be applied to a re-partitioning operation.

Figure 11:
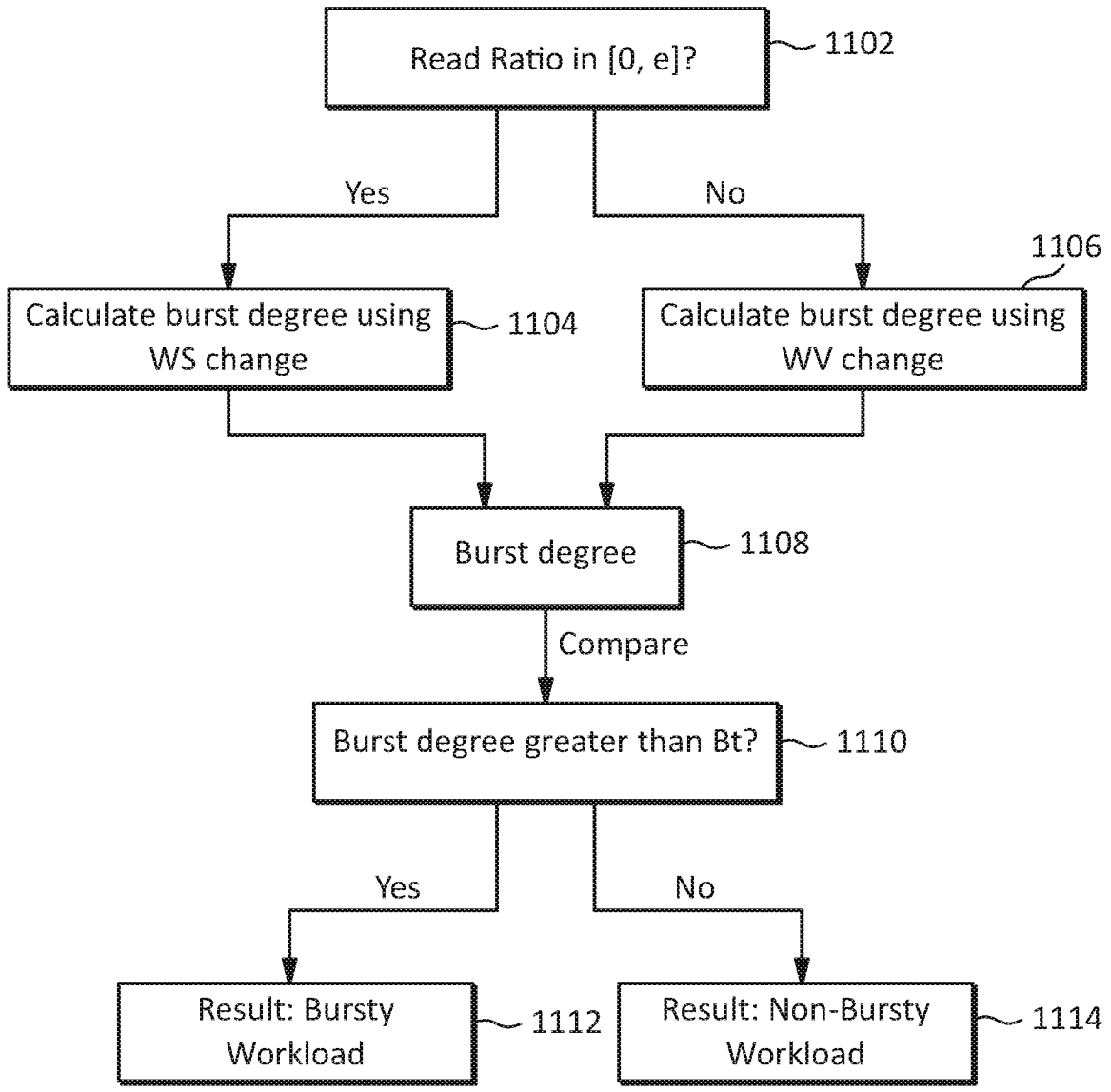
FIG. 11 illustrates an example embodiment of a burst calculation and burst detection method in accordance with example embodiments of the disclosure.

FIG. 11 illustrates an example embodiment of a burst calculation and burst detection method in accordance with example embodiments of the disclosure. The method may begin at operation 1102 where the read ratio for the current workload may be compared to the read ratio threshold e. If the read ratio is less than or equal to e, the method may proceed to operation 1104 where the change in working set may be used to calculate the burst degree Bd. However, if at operation 1102 the read ratio is determined to be greater than e, the method may proceed to operation 1106 where the change in working volume may be used to calculate the burst degree Bd. At operation 1108, the burst degree Bd may be compared to the burst threshold Bt. If the burst degree is greater than Bt, the method may proceed to operation 1112 where the current workload is determined to be a bursty workload. However, if at operation 1110 the burst degree is less than or equal to Bt, the method may proceed to operation 1114 where the current workload is determined to be a non-bursty workload.

4. Partitioning Methodology for Bursty Workloads

When bursty I/Os are identified by a burst detector such as the burst detector subsystem 710, a partition manager system in accordance with example embodiments of the disclosure may aggressively adjust the partition for each client in a tier of storage (e.g., a top-tier which may operate as a storage cache) based on a recent change in its working set size (for read-intensive workloads) or working volume size (for non-read-intensive workloads). In some embodiments, this may result in a relatively fast re-partitioning operation that may accommodate an impending I/O burst.

4.1 Partitioning Workflow for Bursty Workloads

In some embodiments, a partitioning method for a bursty workload in accordance with example embodiments of the disclosure may determine a partition size for each client based, at least in part, on one or more of the following two aspects of the workload: (1) a workload change during a recent epoch (e.g., of the PMSW); and/or (2) a hit ratio for a cache in a current epoch.

Although not limited to any specific implementation details, the partitioning method for a bursty workload described below may be used, for example, by the aggressive solution component 720 of the strategy selector subsystem 718 based on feedback about the workload, for example, data received from the workload monitor subsystem 702 illustrated in FIG. 7.

In some embodiments, the workload change may be used to calculate a demanded space size (DSS), for example, to quickly adapt to workload changes. For example, a client may experience an I/O burst which may involve a relatively large amount of cache space. However, if adequate space for the I/O burst is not available in the cache, it may increase the delay and/or latency for that client. In some embodiments, a DSS may be used to reduce or prevent this type of situation.

In some embodiments, the storge cache hit ratio may be used to calculate a guaranteed minimal space size (GMSS), for example, as a contribution ratio of the cache for each client. In some embodiments, this may be used to reduce or prevent the cached slot from being flushed from the cache caused by I/O bursts by other clients.

Figure 12:
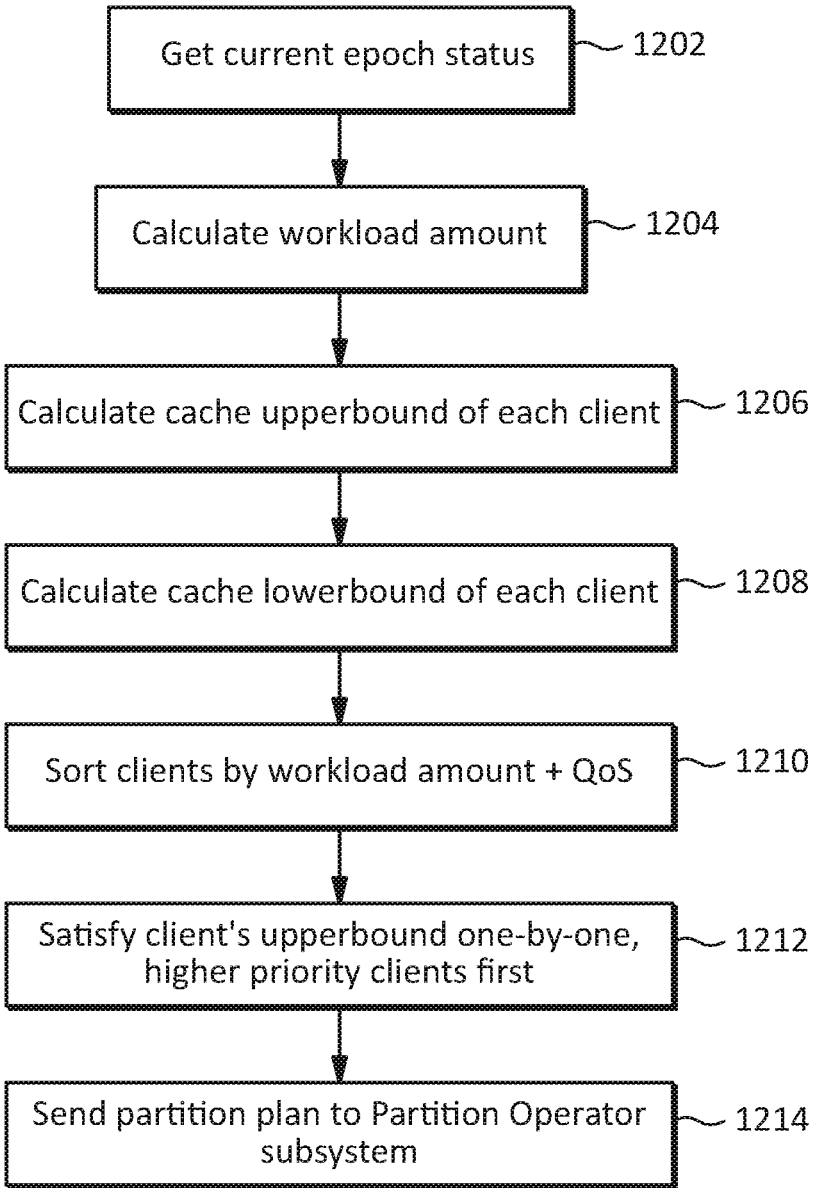
FIG. 12 illustrates an example embodiment of a method for a partitioning method for a bursty workload in accordance with example embodiments of the disclosure.

FIG. 12 illustrates an example embodiment of a method for a partitioning method for a bursty workload in accordance with example embodiments of the disclosure. The method illustrated in FIG. 12 may be performed, for example, by the aggressive solution component 720 illustrated in FIG. 7. The method may begin at operation 1202 where the current epoch status (lines 3-4) may be obtained from the PACUW window 712 which may record multiple epoch information from the PMSW window 708 in the workload monitor subsystem 702. At operation 1204, a workload amount for each client may be calculated as described below. At operations 1206 and 1208, a cache upperbound and lowerbound may be calculated, respectively, for each client based on the workload amount as described below. At operation 1210, a client list may be sorted based on the workload amount and a weight for each client which, in some embodiments may be based on a QoS. At operation 1212, the cache may be partitioned to each client one-by-one to satisfy each client's upperbound such that partitions for clients with a higher weight (e.g., priority) may be allocated first. At operation 1214, the partitioning plan may be sent to the partition operation subsystem 724 for implementation.

Any type of weight function may be used for the sorting and/or partitioning operations. In some embodiments, any weight function may be used to combine a workload amount and a QoS. In some example implementations, a percentage-based QoS may be multiplied with a workload amount. For example, for client i, with workload amount Wi and QoS percentage Qi, a weighted workload amount may be calculated as $$w_i = \frac{Q_i}{\sum_{v \in V} Q_v} \times W_i, \qquad \text{Eq. 2}$$

where v may be the iterated client in the set of all clients V.

Algorithm 4 illustrates some example operations of an embodiment of a method for a partitioning method for a bursty workload in accordance with example embodiments of the disclosure. Algorithm 4 may be performed, for example, by the aggressive solution component 720 illustrated in FIG. 7. In the embodiment illustrated in Algorithm 4, code to obtain the current epoch status may be located at lines 3-4.

---

Algorithm 4

```
1  Subsystem_3_Stradegy_Selector:
2     Component_5_Aggressive_Solution:
3        # Step 1: Get current epoch status
4        curEpochStatus=getCurEpochStatus( )
5        # Step 2: Calculate workload amount
6        workloadAmountList = for each clientID,
              calWorkloadAmount(clientID, curEpochStatus )
7        # Step 3: Calculate cache upperbound of each client
8        upperboundList = for each clientID, calUpperbound(clientID,
              curEpochStatus)
9        # Step 4: Calculate cache lowerbound of each client
```

---

-continued

---

Algorithm 4

```
10       lowerboundList = for each clientID, calLowerbound(clientID,
              curEpochStatus)
11       for clientID in lowerboundList:
12          if lowerbound(clientID) >= upperbound(clientID):
13             lowerbound(clientID) = upperbound(clientID)
14       # Step 5: Sort clients by workload amount + QoS
15       sortedClientList=sortBy(workloadAmountList, QoSList)
16       # Step 6: Satisfy client's upperbound one-by-one, higher priority
              clients go first
17       plan = for client in sortedClientList: satisfy(upperboundList,
              lowerboundList)
18       # Step 7: Send plan to subsystem 4
19       return plan
```

---

4.2 Workload Amount

A workload amount |W| may be used to represent an actual workload amount, for example, from the perspective of a cache slot allocation. In some embodiments, the workload amount may be determined by a piecewise function based on different workload read ratios as shown in Eq. 3.

$$|W|_i = \begin{cases} |V|_i, & \text{if } R \in [0, e) \\ |S|_i, & \text{if } R \in [e, 1] \end{cases} \qquad \text{Eq. 3}$$

In some embodiments, read-intensive workloads new cache slots may not be allocated for repeatedly requested addresses because they may not modify the content. Thus, as shown in Eq. 3, if the recent PMSW epoch workload is a non-read-intensive workload, then the working volume may be used as the workload amount. However, if the recent PMSW epoch workload is a read-intensive workload, then the working set may be used as the workload amount.

At the end of each PMSW epoch, a partition management system in accordance with example embodiments of the disclosure may check the recent status of all clients sharing the disaggregated storage system. Table 4 illustrates some example values of status information that may be obtained from the workload monitor subsystem 702 and recorded by the PACUW window 712 in the burst detector subsystem 710. The values provided in Table 4 are for purposes of illustration only, and other values may be obtained and/or used.

As illustrated in Table 4, the working set size |S| or the working volume size |V| may be selected as the workload amount |W| which may be used to calculate the next epoch allocation.

TABLE 4

| ClientID (i) | R (Read Ratio in Recent Epoch) | |S| (Working Set Size in Recent Epoch) | |V| (Working Volume Size in Recent Epoch) | |W| (Workload Amount in Recent Epoch) | |C| (Cache Size in Recent Epoch) | H (Hit Ratio in Recent Epoch) |
|---|---|---|---|---|---|---|
| Client1 | 97% | 100 GB | 760 GB | 100 GB | 40 GB | 35% |
| Client2 | 78% | 120 GB | 200 GB | 200 GB | 60 GB | 70% |
| Client3 | 47% | 30 GB | 1430 GB | 1430 GB | 100 GB | 43% |
| Client4 | 98% | 10 GB | 66 GB | 10 GB | 50 GB | 29% |

In some embodiments, the status information may include additional information such as touched file number, touched file part vs touched file size percentage, and/or the like.

4.3 Upperbound and Lowerbound

For a bursty workload, a partition management system in accordance with example embodiments of the disclosure may aggressively and/or proportionally assign top-tier storage resources (which may operate as cache space) to each client based on the client's workload amount for the recent epoch. Thus, the system may attempt to dynamically and/or aggressively assign more top-tier storage resources to clients that may have more bursty I/Os in the recent epoch. In some embodiments, the system may strive to aggressively push each client's next epoch cache space to its demand based on the current epoch status of the client. To achieve this allocation, cache space may be proportionally reallocated among all clients using the upperbound as set forth in Eq. 4.

$$\begin{cases} \text{Upperbound: } |C|_{new}(i) = \dfrac{|W|_i}{\sum_{i \in \{V\}} |W|_i} \times |C|_{max} \\ \text{Lowerbound: } |C|_{new}(i) = |C|_{cur}(i) \times |H|_{cur}(i) \end{cases} \qquad \text{Eq. 4}$$

In some embodiments, the upperbound may be referred to as demanded space size (DSS), for example, because it may be close to or match the size for the next epoch based on a proportional allocation method.

In some embodiments, the lowerbound may be used to ensure that one or more clients may have a guaranteed minimum space size (GMSS), for example, so that their cached data may not be easily flushed due to bursts in the workload. For example, based on the last epoch's hit rate, the last hit percent of the caches may potentially be useful in the next epoch. Thus, that amount may be used as the minimal guaranteed cache space for each client.

Code to obtain the upperbounds and lowerbounds for each client may be located at lines 7-10 of Algorithm 4.

In some embodiments, there may be a special case if the lowerbound is greater than or equal to the upperbound, in which case the system may assign the minimum value of the upperbound and the lowerbound to both the upperbound and the lowerbound. That is, upperbound=min(lowerbound, upperbound) and lowerbound=min(lowerbound, upperbound). This may occur, for example, when a client's current epoch has a relatively high number of cache hits (e.g., the lowerbound may be larger), while the workload is not considered to be bursty in current epoch (e.g., the upperbound may be smaller). In this case, the upperbound may be given greater influence on the partition amount because it may be the target based on the prediction. Therefore, the DSS may override any existing GMSS. (In some embodiments, GMSS may be intended to prevent a client's cached data from being entirely flushed out due to bursts from other clients). This may be seen, for example, in lines 11-13 of Algorithm 4.

5. Partitioning Methodology for Non-Bursty Workloads

In some embodiments, for a non-bursty workload, a partition manager system in accordance with example embodiments of the disclosure may have adequate time to perform a more extensively optimized re-partitioning which may take into consideration one or more factors such as estimated hit ratios, workloads, the weights of each client, and/or the like.

5.1 Partitioning Workflow for Non-Bursty Workloads

In some embodiments, a re-partitioning workflow for a non-bursty workload in accordance with example embodiments of the disclosure may adjust the partition size of each client (v) so as to maximize an objective function which may provide a way to evaluate the effectiveness of a given partitioning plan.

Eq. 5 provides an embodiment of an optimization framework which may be used, for example, to re-partition one or more tiers (e.g., a top-tier which may operate as a storage cache) of a storage layer. Table 5 provides some example meanings of symbols used in Eq. 5. Although the embodiment of the workflow illustrated in Eq. 5 is not limited to any particular implementation details, in some embodiments it may be implemented, for example, by the optimal solution component 722 illustrated in FIG. 7.

TABLE 5

| Symbol | Meaning |
|---|---|
| $|C|_{max}$ | Total capacity of the first tier (cache tier). |
| $|C|_v$, $|C|_{cur}(v)$ | Both may represent the current cache size of client v. |
| $\Delta|C|_v$ | Discrete change (step) of cache of client v which may be iterated from $[-|C|_v, |C|_{max} - |C|_v]$. The cache size of client v may be iterated from 0 to the entire capacity of the first tier storage. A customized upperbound or lowerbound of each client's cache size may be added by changing the range of $\Delta|C|_v$. |
| $W_v$ | Weight of client v based on QoS, SLA, and/or the like. One implementation may be $w_i = \dfrac{Q_i}{\sum_{v \in V} Q_v} \times W_i$. |
| v, {V} | One client v, and the all client set {V} |
| ExpHitRatio(v, $|C|_v + \Delta|C|_v$) | Expected hit ratio of client v in the next epoch if the change of $\Delta|C|_v$ is added to the current cache size. |
| ExpWorkVol(v) | Expected working volume of client v in the next epoch. |
| $\Delta|C|_{opt}(v)$, $\{\Delta|C|_{opt}(v \in \{V\})\}$ | Under an optimal solution, the cache change size of client v, and the set of the cache change sizes of all clients, respectively. |
| $|C|_{new}(v)$ | New size of client v's cache. |

$$\text{Max: } \frac{1}{|C|_{max}}$$

$$\sum_{v \in \{V\}} [w_v \times \text{Exp Hit Ratio}\,(v, |C|_v + \Delta|C|_v) \times \text{Exp Work } Vol(v)] \qquad \text{Eq. 5}$$

$$\text{S.t.: } \Delta|C|_v \in [-|C|_v, |C|_{max} - |C|_v]$$

$$\text{Exp Hit Ratio}\,(v, |C|_v + \Delta|C|_v) \in [0\%, 100\%]$$

$$\sum_{v \in \{V\}} (\Delta|C|_v) = 0$$

$$\sum_{v \in \{V\}} (w_v) = 100\%$$

The framework of Eq. 5 may begin by calculating the weighted sum of the expected hit ratio of each client if the client has a cache size change $\Delta|C|_v$ (e.g., ExpHitRatio(v, $|C|_v + \Delta|C|_v$)) multiplied by its expected working volume (e.g., ExpWorkVol(v)) in the next PMSW epoch. As mentioned above in section 4.1, the term "weight" ($W_v$) may reflect each client's QoS, SLA, and/or the like. The term $\Delta|C|_v$ may be iterated for a range of possible cache assignment cases. In some embodiments, granularity of the iteration steps may be set to a relatively coarse-grained amount (e.g., 100 MB) which may reduce the overhead associated with solving the optimization framework.

The framework of Eq. 5 may then divide the weighted sum by the total cache size ($|C|_{max}$).

In some embodiments, a physical meaning of this result may be characterized as the expected hit amount (e.g., a working volume, in bytes), expressed per-byte of cache capacity, that can be achieved in the next epoch based on implementing a certain partition plan. Thus, maximizing the objective function of Eq. 5 may improve or optimize the partitioning plan.

In some embodiments, the expected hit amount may be the total of $\Delta|C|_v$ for all clients (that is, the $\Delta|C|_v$ list).

Eq. 5 may include a constraint section ("S.t."), which may apply the following limits: (1) the size of each client's space in the top tier storage (e.g., cache size); (2) the range of expected hit ratio in [0%, 100%]; (3) all change's ($\Delta|C|_v$) sum to be zero (because the amount of cache space may not change, it may only be reallocated between clients); and (4) the sum of all clients' weights to 100%.

In some embodiments, the objective function in Eq. 5 may be used to find a list of deltas (e.g., change of top tier storage amount) for all clients (wherein the list may be denoted $\{\Delta|C|_{opt}(v{\in}\{V\})\}$) for an optimal solution. Based on the list $\{\Delta|C|_{opt}(v{\in}\{V\})\}$, a partition manager system in accordance with example embodiments of the disclosure may return a final re-partition plan for all clients as shown in Eq. 6.

$$\forall v{\in}\{V\}{:}|C|_{new}(v){=}|C|_{cur}(v){+}\Delta|C|_{opt}(v) \qquad \text{Eq. 6}$$

latest CDF curve, the hit ratio may be estimated by inputting a given cache size to the getProbability function of CDF (which may be implemented at line 6). In some embodiments, this may determine how many percentages of the recorded accessed data may have a reuse distance less than cacheSize.

The function runtimeUpdateRecordTable (which may be implemented at lines 14-37) may be a separate function running in the background that may update the record table when a new I/O request arrives.

| Algorithm 5 |
| --- |

```
1     Function estimateHitRatio(clientID, cacheSize):
2         # update CDF record
3         CDF.update(clientID, getEpochID( ), k)
4         # input: cacheSize as x-axis, we need to convert the unit
5         # output: probability (y-axis) of buckets having equal or less max
              reaccess distance than the cache size
6         return CDF.getProbability(convertIOReqSizeToBucketsSize(cacheSize))
7
8     Function CDF.update(clientID, curEpochID, k):
9         # only focus on recent k (preset number) epochs entries
10        focusTable=recordTable[clientID].filter(volume="epochID", rule=">K")
11        # build a CDF data strucutre, x-axis is max reaccess distance, and
              y-axis is the probability
12        buildCDF(focusTable.maxReuseDistance)
13
14    Function runtimeUpdateRecordTable(clientID):
15        for each IOReq in clientID:
16            buckets=convertIOReqToBuckets(IOReq)
17            for bucketID in buckets:
18                curAccessTime+=1
19                recordEntry=recordHashTable[clientID][bucketID]
20                # no record found, then create a new entry
21                if (recordEntry==NULL):
22                    recordEntry.setLastAccessTime(curAccessTime)
23                    recordEntry.setEpochID(getEpochID( ))
24                    recordEntry.setMaxReuseDistance(infinite)
25                    recordHashTable[clientID][bucketID]=recordEntry
26                # found record, then update it
27                else:
28                    recordEntry.setLastAccessTime(curAccessTime)
29                    if |recordEntry.getEpochID( )-getEpochID( )|<= k:
30                        if recordEntry.getMaxReuseDistance( )==infinite:
32                            recordEntry.setMaxReuseDistance(curAccessTime-
                                recordEntry.getLastAccessTime( ))
33                        else:
34                            # update ARD
35                            recordEntry.setMaxReuseDistance(max(recordEntry.
                                getMaxReuseDistance( ),curAccessTime-recordEntry.
                                getLastAccessTime( )))
36                    else:
37                        recordEntry.setMaxReuseDistance(infinite)
38                        recordEntry.setEpochID(getEpochID( ))
```

5.2 Hit Ratio Estimation

In some embodiments, to estimate the hit ratio (ExpHitRatio(v, $|C|_v{+}\Delta|C|_v$)), a reaccess distance-based analytical modeling framework may be used to provide online prediction of cache performance for a range of cache configurations and/or replacement policies (e.g., least recently used (LRU)).

An example embodiment of a reaccess distance-based analytical modeling framework in accordance with example embodiments of the disclosure is illustrated in Algorithm 5. A main procedure, which may be located at lines 1-6, may call the function CDF.update (where CDF may indicate cumulative distribution function) to update a CDF curve (which may be implemented at lines 8-12). Based on the In Algorithm 5, the function runtimeUpdateRecordTable (clientID) may run in the background during runtime. It may first convert incoming I/O requests (from clientID) to data buckets which may have a granularity set, for example, to 5 MB or 50 MB for statistical analysis purposes. A counter named curAccessTime may self-add 1 for each new data bucket.

Algorithm 5 may record the "distance" between the incoming I/O request data bucket's current access and its last access. In some embodiments, the distance may refer to the Absolute Re-access Distance (ARD)", rather than Unique Re-access Distance (URD)".

This may be understood with reference to a Re-access Interval (RI). An address trace T may be a mapping of consecutive integers in increasing order, representing successive positions in the trace. Tuples $(x, \tau)$ may be used to represent all accesses where $(x, \tau) \in T$, and where x may represent the address and $\tau$ may identify its repetition number. The first occurrence of address x in the trace may be represented by $(x, 0)$. The expression $t=T^{-1}$ may denote the inverse function, and $t(x, \tau)$ may denote the position of the $\tau$-th occurrence of address x in the trace.

RI may be defined only when $m>0$ and may denote the portion of the trace enclosed between the m-th and (m-1)-th occurrence of x, as shown in Eq. 7.

$$RI(x, \tau) = \begin{cases} \{(\theta, \tau')|t(x, \tau-1) < t(\theta, \tau') < (\theta, \tau)\}, & \text{if } \tau > 0 \\ \text{undefined}, & \text{else} \end{cases} \quad \text{Eq. 7}$$

The URD may then be calculated as shown in Eq. 8. RI may denote the total number of unique addresses between two occurrences of the same address in the trace.

$$URD(x, \tau) = \begin{cases} \{\theta|(\theta, \tau') \in RI(x, \tau)\}, & \text{if } \tau > 0 \\ \text{undefined}, & \text{else} \end{cases} \quad \text{Eq. 8}$$

ARD may also be calculated as shown in Eq. 9. ARD may denote the total number of positions between two occurrences of the same address in the trace.

$$ARD(x, \tau) = \begin{cases} |RI(x, \tau)| = t(x, \tau) - t(x, \tau-1) - 1, & \text{if } \tau > 0 \\ \infty, & \text{else} \end{cases} \quad \text{Eq. 9}$$

The function may then search each new bucket in the recordTable, which may be implemented, for example, by a hash table where the key may be the bucketID, and the value may be a tuple of multiple factors. If an entry is not found, it may indicate that this is the first time this data bucket has occurred, so a new entry may be created with values for the entry saved in the recordTable. In some embodiments, the current epochID may also be stored in the table too, for example, to further help fade out old data. Code for this operation may be located at lines 10-29 of Algorithm 5.

Table 6 illustrates some example values that may be recorded in a recordTable by the function runtimeUpdateRecordTable(clientID). The values provided in Table 6 are for purposes of illustration only, and other values may be obtained and/or used.

TABLE 6

| (key) | (value) | | |
|---|---|---|---|
| bucketID | lastAccessTime | epochID | maxReuseDistance |
| 00000001 | 0 | 0 | 1233 |
| 00000022 | 14176 | 4 | 464 |
| 00000510 | 6586 | 1 | 342 |
| 00001492 | 435 | 0 | 53 |
| . . . | | | |

In Algorithm 5, the function estimateHitRatio may be called to estimate the cache hit ratio for a given cache size. The function estimateHitRatio may trigger the function CDF.update which may update the CDF record, for example by building a new CDF curve of max-reuse distance and percentage of bins as shown in FIG. 13.

Figure 13:
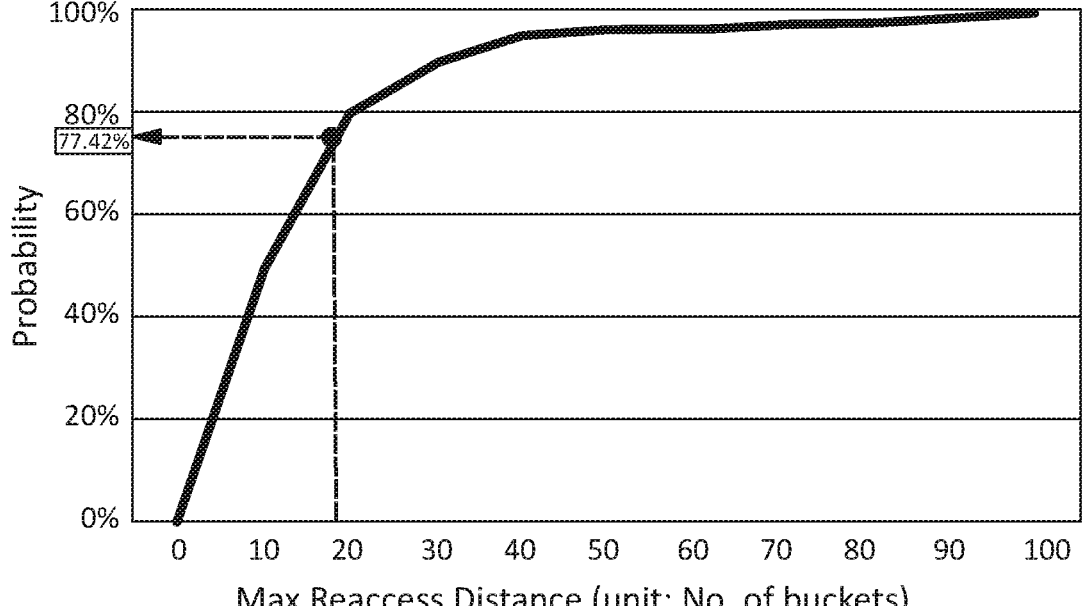
FIG. 13 illustrates an example embodiment of a CDF curve for a hit ratio estimation operation in accordance with example embodiments of the disclosure.

FIG. 13 illustrates an example embodiment of a CDF curve for a hit ratio estimation operation in accordance with example embodiments of the disclosure. The CDF curve illustrated in FIG. 13 may help estimate the hit ratio given clientID and cacheSize. In FIG. 13, the X-axis may represent the max-reuse distance, and the Y-axis may represent the percentage of the number of buckets that have lower max-reaccess distances than a certain distance in the X-axis. Thus, a hit ratio estimation operation may iterate different cache sizes (max-reuse distances) to check the upper bound of the hit ratio it can offer for this period of workload. In some embodiments, a cache hit may be possible only when the cache size is larger than the max-reuse distance. Thus, a connection may be built between the cache size and the theoretical best result of an LRU caching algorithm hit ratio. In some embodiments, the curve may represent a maximum cache hit ratio. Thus, a reduction adjustment may be assigned to it.

5.3 Working Volume Estimation

In some embodiments, an averaging technique may be used to estimate the working volume ExpWorkVol(v). For example, some embodiments may use a moving window average technique such as a weighted moving average (WMA) and/or an exponentially weighted moving average (EWMA) to predict a working volume. In some embodiments, a weighted average may be implemented as an average having multiplying factors to give different weights to data at different positions in a sample window. Thus, mathematically, a weighted moving average may be a convolution of datum points with a fixed weighting function. In some embodiments, an EWMA technique may involve weights that decrease in an arithmetical progression.

For purposes of illustration, some embodiments may be described in the context of an EWMA technique (which may employ a first-order infinite impulse response filter to apply weighting factors that may decrease exponentially) and some specific values of parameters. However, other techniques and or values may be obtained and/or used in accordance with this disclosure.

Table 6 provides some example meanings of symbols used in Eq. 10 below. Although the embodiment of the workflow illustrated in Eq. 10 is not limited to any particular implementation details, in some embodiments it may be implemented, for example, by the optimal solution component 722 illustrated in FIG. 7.

TABLE 6

| Symbol | Meaning |
|---|---|
| t | Epoch ID t (time sequence). |
| $|V|_{v, t}$ | Working volume size of client v during epoch t. |
| $\alpha$ | The degree of weighting decrease, which may be a constant smoothing factor between 0 and 1. A higher $\alpha$ may discount older observations faster. Some embodiments may use a value of $\alpha = 0.5$. |
| k | number of epochs used for calculating the working volume (For example, for k = 100, the most recent 100 epochs may be used.) |

In some embodiments, an EWMA technique may be used to calculate (e.g., predict) the next epoch working volume for client v based on the previous epoch working volume record for the client, as shown in Eq. 10.

$$|V|_{v,t+1} = \alpha[|V|_{v,t} + (1-\alpha)|V|_{v,t-1} + (1-\alpha)^2|V|_{v,t-2} + (1-\alpha)^3|V|_{v,t-3} + \ldots] \quad \text{Eq. 10}$$

Because Eq. 10 may be an infinite sum with decreasing terms, a working volume estimation technique in accordance with example embodiments of the disclosure may limit the number of terms used in Eq. 10 to reduce overhead for computation and/or storage (e.g., storage used to record I/O transaction history). For example, the number of recorded previous epochs may be limited to a value of "k". That is, to approximate the prediction of working volume, terms after the k-th term may be omitted from Eq. 10. Thus, Eq. 10 may be simplified to Eq. 11.

$$|V|_{v,t+1} = \alpha \left\{ \sum_{k \in [0,k_{max}]} \left[ (1-\alpha)^k |V|_{v,t-k} \right] \right\} \qquad \text{Eq. 11}$$

In some embodiments, during the initialization phase, few data points of working volume size may be available. Thus, during the initialization phase, the working volume may be calculated, for example, from the first few observations and/or an average of 4-5 PMSW epochs.

6. Partition and Content Update

After the strategy selector subsystem 718 determines a partitioning strategy for a storage tier (e.g., a top-tier which may operate as a storage cache), it may be transferred to the partition operator subsystem 724 for implementation. In some embodiments, implementing a partitioning strategy may involve eviction and/or fetching operations.

6.1 Partition and Content Update Workflow

FIG. 14 illustrates an example embodiment of a partition and content update workflow in accordance with example embodiments of the disclosure. Although the embodiment of the workflow illustrated in FIG. 14 is not limited to any particular implementation details, in some embodiments it may be implemented, for example, by the partitioner component 726 illustrated in FIG. 7. In some embodiments, the terms "cache size", "cache space", "new partition", and "quota" may be used interchangeably.

The workflow illustrated in FIG. 14 may begin at operation 1402 where the size of a client's new partition may be compared to the size of its current partition. In some embodiments, the comparison may result in one of three cases. (Case 1) If the client's new partition is smaller than its previous size, the workflow may proceed to operation 1404 where the workflow may evict one or more of the client's cached slots, then shrink the partition to the new size. (Case 2) If the client's new partition is equal to its previous size, the workflow may proceed to operation 1406 where it may leave the partition at its current size. (Case 3) If the client's new partition is larger than its previous size, the workflow may proceed to operation 1408 where the workflow may increase the size of the partition. In Case 3, there may be two options for the new space in the client's partition. (Option 1) The workflow may proceed to operation 1410 which may be described as a passive option. In the passive option, the new space in the client's partition is initially left blank. The new blank space may gradually fill as new I/O requests may progressively fill the blank space. (Option 2) The workflow may proceed to operation 1412 which may be described as a proactive option. The workflow may proactively prefetch data from another tier of storage (e.g., the second tier if the cache is the top-tier) and copying it to the first tier to fill in the blank space. For example, in some embodiments, the workflow may copy warm data that may not be cached, but, based on I/O history, may be frequently used, to the blank space in the client's new partition. In some embodiments, the workflow may proceed to operation 1414, before filling in all of the new blank space where a prefetch size may be adaptively adjusted as described below.

After the re-partition is completed, the client may continue using its new quota until the next re-partition operation occurs.

In some embodiments, the decision to use passive option (Option 1) or the proactive option (Option 2) may involve one or more tradeoffs that may be weighed based on the system implementation details. For example, the passive option may be simpler to implement and/or may involve less overhead because no data may be moved until it becomes the subject of an I/O request. However, with the passive option, the hit ratio of the client whose cache space is increased may be underutilized because the blanks may not be filled, for example, until a future I/O burst fills the blanks. Additionally, or alternatively, some of the blank space may be underutilized, for example, if the prediction of the burst is not accurate and/or if the workload of the client changes for the next epoch.

With the proactive option, the hit ratio for the client may increase because more data may be available in the cache. Moreover, proactively filling the blank space may result in better utilization of the cache space. However, the proactive option may result in higher overhead, for example, because the system may perform one or more operations to select (including any calculations behind the selection) and transfer warm data that had not previously been cached in the first tier. Moreover, there may be a risk that some or all of the prefetched data may not be useful (e.g., reaccessed) in the next epoch, thereby resulting in extra overhead.

Algorithm 6 illustrates some example operations of an embodiment of partition and content update workflow in accordance with example embodiments of the disclosure. Algorithm 6 may be performed, for example, by the partitioner component 726 illustrated in FIG. 7. In the embodiment illustrated in Algorithm 6, code to process Case 1 may be located at lines 4-6, code to process Case 2 may be located at lines 7-10, and code to process Case 3 (including Option 1 and Option 2) may be located at lines 11-18.

| Algorithm 6 |
| --- |

| 1 | Subsystem_4_Partition_Operator: |
| 2 | Component_7_Partitioner: |
| 3 | Function Partition( ): |
| 4 | # Case 1: Client's new partition is smaller than its previous size, then PMDS needs to evict some of its cached slots, and then shrink the size of its partition. |
| 5 | if CacheQuota[clientID, nextEpoch] < CacheQuota[clientID, curEpoch]: |
| 6 | cache.evictLeastRecentUsedDataToSecondTier(clientID, CacheQuota[clientID, curEpoch]-CacheQuota[clientID, nextEpoch]) |

-continued

| Algorithm 6 |
| --- |

```
7          # Case 2: Client's new partition is equal to its previous size,
                PMDS keeps the current partition size.
8          else if CacheQuota[clientID, nextEpoch] < CacheQuota[clientID,
                curEpoch]:
9              # keep the current quota plan
10             pass
11         # Case 3: Client's new partition is greater than its previous size,
                PMDS needs to increase the size of it and then we have two
                options.
12         else if CacheQuota[clientID, nextEpoch] > CacheQuota[clientID,
                curEpoch]:
13             if OPTION__1:
14                 # passive operation: leave new slots blank
15                 pass
16             else if OPTION__2:
17                 # proactive operation: prefetch some warm data from the
                    second tier to fill the blank
18                 prefetchWarmDataFromSecondTier(clientID,
                    calPrefetchGranularity[clientID],
                    CacheQuota[clientID, nextEpoch]-CacheQuota[clientID,
                    curEpoch])
```

6.2 Adaptive Prefetch Size Adjustment

During a re-partitioning operation, if a client's new partition is larger than its previous size, and a partition manager system decides to proactively fill the blank space in the new partition (e.g., Case 3, Option 2 as described above), some embodiments of a partition manger system in accordance with example embodiments of the disclosure may provide an adaptive prefetch size adjustment (APSA) feature.

In some embodiments, an APSA feature may adjust the prefetch data size, for example, based on the top I/O-size popularity of each client in the recent epoch. For example, an APSA feature may adaptively and/or automatically change prefetch data size. A prefetch technique may boost execution performance, for example, by fetching data from the slower second-tier storage to the faster first-tier (cache tier) storage before it is actually needed. In a proactive operation option, data may be prefetched to fill in blank space of a newly assigned partition before the client requests the data (e.g., by making an I/O request for a cache location that was previously blank).

In some embodiments, if the majority of the I/Os from a client in the recent epoch are in the top I/O size (range) (e.g., 16 KB), then it may be possible or likely that the client will follow the same or similar pattern in the future. Thus, prefetching warm data from the second tier using the granularity of the top I/O size may help bypass the lookup process (which may be time consuming) in the second tier again if there is a partial cache hit in the first tier in the future. A partial cache hit may occur when only part of the requested I/O is found in the cache, so a second tier lookup may be performed to find the remaining part of the requested I/O.

Thus, by performing a prefetch with a granularity of the top I/O size, a partition manager system in accordance with example embodiments of the disclosure may help upgrade a partial cache hit to a full cache hit (e.g., the full requested I/O may be cached in the first tier).

Eq. 12 illustrates an embodiment of an equation that may be used to implement adaptive prefetch size adjustment in accordance with example embodiments of the disclosure. Eq. 12 may be implemented, for example, by the partitioner component 726 illustrated in FIG. 7. Table 7 provides some example meanings of symbols used in Eq. 12, and may further explain the relationships between a cache miss, a partial cache hit, and a full cache hit.

In some embodiments, CachedIOReq may be characterized as the found data (cached in the first tier) of a new I/O request, which may be calculated as follows based on Eq. 12.

$$CachedIOReq=\{x|x\in IOReq, x\in CachedIO\} \qquad Eq.12$$

Where IOReq may refer to a set of data in the new I/O request, and CachedIO may refer to all data currently in the cache tier. The union of IOReq and CachedIO sets may be the found data of this I/O in the cache.

In some embodiments, a preset prefetching amplification factor AF may be used, for example, to increase the flexibility of an APSA feature. As an example, the amplification factor may be in the range [−100%,100%]. In some embodiments, the prefetching granularity may be further adjusted, for example, by setting AF to 5 percent such that it may prefetch an extra 5 percent of data compared to the "top I/O size". This may be useful, for example, where a storage device block and page alignment may be taken into consideration. For example, a cross-block boundary I/O may trigger more data access than its I/O request size.

TABLE 7

| Cache status | Subcategory | Equations |
| --- | --- | --- |
| Cache miss | N/A | \|CachedIOReq\| = 0 |
| Cache hit | Partial cache hit | \|IOReq\| > \|CachedIOReq\| |
| Cache hit | Full cache hit | \|IOReq\| ≤ \|CachedIOReq\| |

Algorithm 7 illustrates some example operations of an embodiment of an adaptive prefetch size adjustment feature in accordance with example embodiments of the disclosure. Algorithm 7 may be performed, for example, by the partitioner component 726 illustrated in FIG. 7. In the embodiment illustrated in Algorithm 7, code to implement an amplification factor AF may be located at lines 6-7.

| Algorithm 7 |
| --- |

```
1    Subsystem__4__Partition__Operator:
2        Component__7__Partitioner:
3            Function calPrefetchGranularity( ):
4                preset prefetching amplification factor AF
```

-continued

| Algorithm 7 |
| --- |

| 5 | result=list( ) |
| 6 | for each clientID: |
| 7 | result[clientID]=getTopRangeIOSize(clientID)*(1+AF) |
| 8 | return result |

Figure 15:
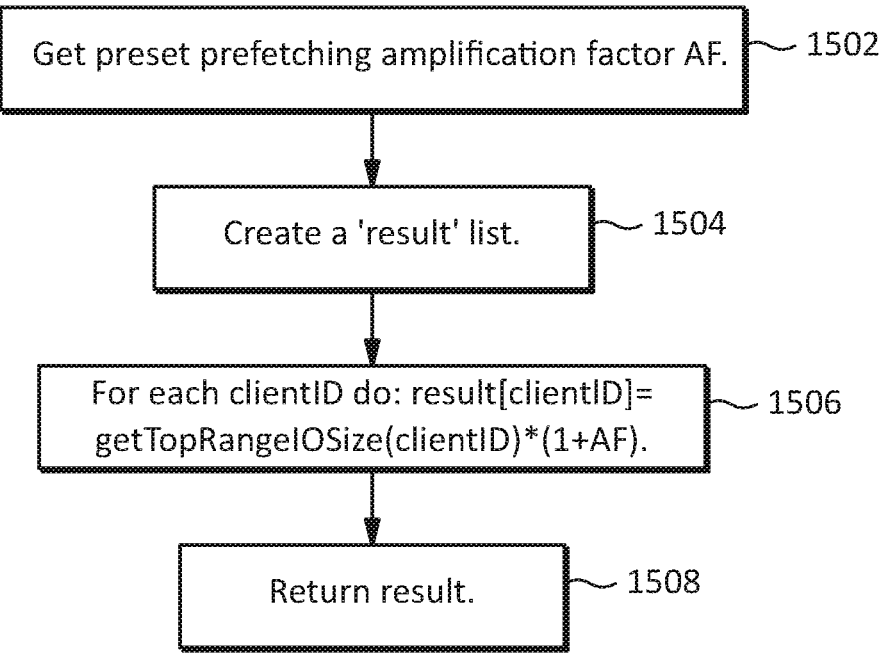
FIG. 15 illustrates an example embodiment of an adaptive prefetch size adjustment method in accordance with example embodiments of the disclosure.

FIG. 15 illustrates an example embodiment of an adaptive prefetch size adjustment method in accordance with example embodiments of the disclosure. Although the embodiment illustrated in FIG. 15 is not limited to any particular implementation details, in some embodiments it may be implemented, for example, by the partitioner component 726 illustrated in FIG. 7.

The method illustrated in FIG. 15 may begin at operation 1502 where the method may obtain the prefetch amplification factor AF. At operation 1504, the method may create a results list that may be used to store the results of the adaptive prefetch size adjustment method. At operation 1506, the method may iterate through the clients to determine the top I/O data sizes for each client. The result list may be returned at operation 1508.

6.3 Data Selection for Filling Blank Cache Space

During a re-partitioning operation, if a client's new partition is larger than its previous size, and a partition manager system decides to proactively fill the blank space in the new partition (e.g., Case 3, Option 2 as described above), some embodiments of a partition manger system in accordance with example embodiments of the disclosure may select warm data to fill the blank space. In some embodiments, warm data may not be cached, but based on I/O history, may be frequently used.

Algorithm 8 illustrates some example operations of an embodiment of a warm data selection method in accordance with example embodiments of the disclosure. Algorithm 8 may be performed, for example, by the partitioner component 726 illustrated in FIG. 7.

| Algorithm 8 |
| --- |

| 1 | Subsystem_4_Partition_Operator : |
| 2 | Component_7_Partitioner: |
| 3 | Function prefetchWarmDataFromSecondTier(clientID, granularity, blankSize): |
| 4 | =list( ) |
| 5 | candidates.add(descendingSort(getGlobalHistoryRecord( ), freq)) |
| 6 | candidates.remove(cachedIOList) |
| 7 | for each candidate chunk in candidates: |
| 8 | if size(dataToPrefetch)<blankSize: |
| 9 | dataToAdd=getChunkWithGranularity(chunk,granularity) |
| 10 | dataToAdd=trim(dataToAdd, blankSize-size(dataToPrefetch)) |
| 11 | dataToPrefetch.addData(dataToAdd) |
| 12 | else: |
| 13 | break |
| 14 | prefetch(dataToPrefetch, secondTier, firstTier) |
| 15 | return |

In the embodiment illustrated in Algorithm 8, the code at lines 4-6 may create a list of candidates to store all descendingly sorted global historical records (GHRs) in the second tier, which may be sorted, for example, by the access frequency of each data chunk. Any chunk size may be used, for example, 10 MB. In some embodiments, one or more sliding window techniques (e.g., EWMA) may be applied to the global history to record I/O popularity statistics for bins that have been accessed in recent epochs. Depending on the implementation details, this may reflect the warm data access behavior more accurately.

As shown at line 6, by ignoring already cached data (cachedIOList), the method may further iterate each chunk from hottest to coldest, and may add data to the fill into the dataToPrefetch list (in some embodiments, with consideration of amplified granularity calculated in Algorithm 7) until the blank space has been filled. If any blank space still exists, and the iterated data chunk is larger than the blank, the data chunk may be trimmed to fill the blank to prevent wasting any blank space.

As shown at line 14, once the blank space is filled, the dataToPrefetch may be sent to the prefetch function to perform the actual content update from the second tier to the top-tier (cache tier). After the content update is completed, the top-tier storage may run as a cache using any caching algorithm such as LRU, application-aware cache replacement (ACR), clock with adaptive replacement (CAR), and/or the like. In some embodiments, write through and/or write back policies may be supported.

Figure 16:
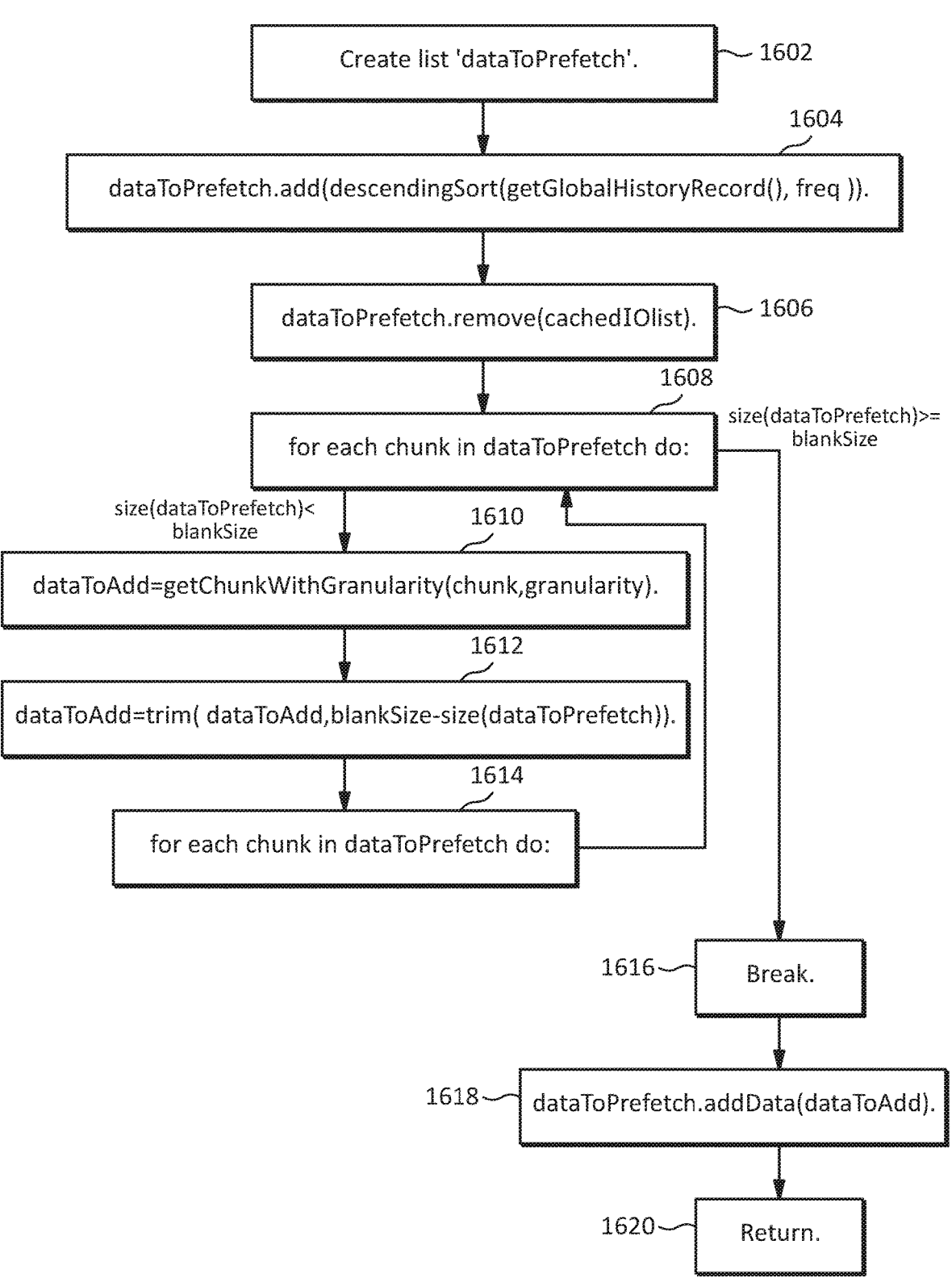
FIG. 16 illustrates an example embodiment of an adaptive prefetch size adjustment method in accordance with example embodiments of the disclosure.

FIG. 16 illustrates an example embodiment of an adaptive prefetch size adjustment method in accordance with example embodiments of the disclosure. Although the embodiment illustrated in FIG. 16 is not limited to any particular implementation details, in some embodiments it may be implemented, for example, by the partitioner component 726 illustrated in FIG. 7.

The method illustrated in FIG. 16 may begin at operation 1602 where a list of candidates may be created. At operation 1604, the list of candidates may be sorted, for example, based on frequency of use. At operation 1606, data that is already cached may be removed from the list of candidates. At operation 1608, a loop may begin for each candidate chunk. As long as the size of data to prefetch is less than the blank size, operations 1610, 1612, and 1614 may add data chunks based on a selected granularity level, trim data that may be larger than a blank, and add the results to a list of data to add, respectively. At operation 1608, once the size of data to prefetch is greater than or equal to the blank size, the method may proceed to operation 1616 which may implement a break operation, then proceed to operation 1618 where the prefetch data is actually written to the cache. The method may terminate at operation 1620.

7. Zoning Based on Preknowledge

In some embodiments, during a deployment stage (which may also be referred to as an early stage or initiate stage), a partition manager system in accordance with example embodiments of the disclosure may not have adequate information to allocate one or more tiers of storage (e.g., a top-tier that may operate as a storage cache) to clients. In these situations, the partition manager system may use preknowledge of clients' I/O patterns, for example, from a client pattern library, vendor selection hardware and/or software, SLAs, QoS, and/or the like to create a partition plan.

For example, in a game streaming datacenter application, preknowledge may exist of the characterization of one or more hosted games such as first-person shot games which may involve frequent writes of small random data, or car racing games that may involve frequent large sequential read I/Os. As another example, in a general-purpose datacenter, preknowledge may exist of workloads such as developers working on virtual machines which may be write-intensive, and 3D video editing on virtual machines may be CPU intensive and may have read-write I/O mixed with high working volume and working set sizes.

Preknowledge such as this may be used to implement one or more zoning techniques to separate workloads by multiple factors (e.g., read ratio, working set size, and/or the like of each workload according to preknowledge). Zoning may be physical, virtual, or any combination thereof. In some embodiments, granularity for physical zoning may be greater than or equal to the size of a storage device, for zone using any of the techniques disclosed herein. For example, the entire loop illustrated in FIG. 7 may run inside each zone.

Algorithm 9 illustrates some example operations of an embodiment of a preknowledge-based zoning method in accordance with example embodiments of the disclosure. Algorithm 9 may be performed, for example, by the partitioner component 726 illustrated in FIG. 7.

| Algorithm 9 |
| --- |
| 1   Function ZoneDeployment(preknowledgeTable, topTierStorage): |
| 2      preset zoneReadRatioThresholds |
| 3      zoneMemberPlan=compareReadRatioAndPlaceInZone(preknowledgeTable, zoneReadRatioThresholds) |
| 4      for zone in zonePlan: |
| 5         for member in zone: |
| 6            zoneAmount[zone]+=selectWorkingSetOrWorkingVolume(member) |
| 7      zoneSizePlan=adjustZoneSizeProportioanllyBasedOn(zoneAmount) |
| 8      assignClientsToZone(zoneMemberPlan, ZoneSizePlan) | example, grouping multiple storage devices into one zone. In some embodiments, granularity for virtual zoning may be less than or equal to the size of a storage device, for example, zoning inside a storage device.

Figure 17:
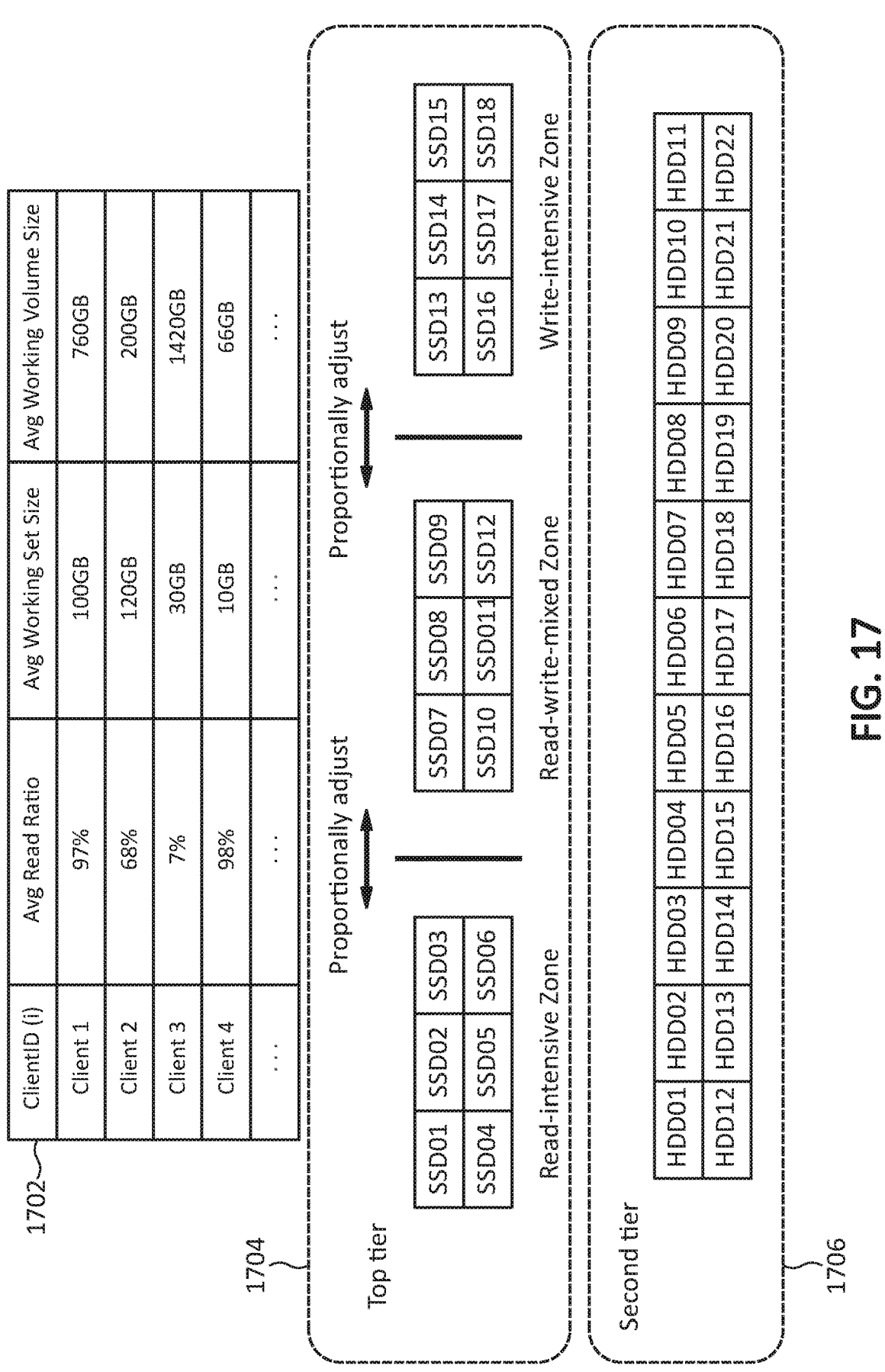
FIG. 17 illustrates an example embodiment of a pre-knowledge-based zoning method in accordance with example embodiments of the disclosure.

FIG. 17 illustrates an example embodiment of a preknowledge-based zoning method in accordance with example embodiments of the disclosure. Although the embodiment illustrated in FIG. 17 is not limited to any particular implementation details, in some embodiments it may be implemented, for example, by the partitioner component 726 illustrated in FIG. 7.

In the embodiment illustrated in FIG. 17, preknowledge of the first four clients (Client 1, Client 2, Client 3, and Client 4) may include average read ratio, average working set size, and average working volume size as shown in table 1702. In some embodiments, averages may be based on a simple average of history records. Alternatively, or additionally, factors other than those listed in FIG. 17 may be used in the deployment zoning process.

In the embodiment illustrated in FIG. 17, a top tier of storage 1704 may be implemented with SSDs, and a second tier of storage 1706 may be implemented with HDDs, but any other number and/or configuration of tiers and/or storage devices may be used.

In this example, the top tier of storage 1704 may have three zones: a read intensive zone for clients having workloads with a read ratio in the range [90%,100%], a read-write-mixed zone for clients having workloads with a read ratio in the range [10%,90%), and a write-intensive zone for clients having workloads with a read ratio in the range [0%,10%). These examples are only for purposes of illustration, and other numbers of zones, ranges of values, and/or the like may be used to create zones.

In the embodiment illustrated in FIG. 17, the partition manager system may proportionally adjust the size of each zone based on, for example, (1) the working set size for the read intensive zone, and/or (2) the working volume size for the read-write-mixed zone and/or the write-intensive zone. In some embodiments, a proportional zone adjustment as illustrated in FIG. 17 may be applied repeatedly (e.g., periodically) to update the zone sizes.

In some embodiments, after the deployment is completed, a partition manager system in accordance with example embodiments of the disclosure may run separately in each In the embodiment illustrated in Algorithm 9, the function ZoneDeployment may take two inputs preknowledgeTable and topTierStorage and may use a preset value zoneReadRatioThresholds as shown at line 2, which may be any number of zones. At line 3, the function may create the zoneMemberPlan by comparing the read ratio of each client in the preknowledgeTable with the thresholds. At lines 4-6, it may then iterate the zoneMemberPlan and calculate each zone's demand amount based on the member client's working set size (for a read intensive zone) or working volume size (for other zones). At line 7, the function may then adjust the zone size proportionally based on the demand amount of each zone. At line 8, the function may assign clients to zones based on the zoneMemberPlan and ZoneSizePlan.

In some embodiments, and depending on the implementation details, a preknowledge-based zoning method in accordance with example embodiments of the disclosure may: (1) reduce device-side write amplification; (2) reduce over-provisioning (which may be similar to early replacement because in both cases the host may consume more devices); (3) reduce memory in storage devices (which may be relatively expensive); (4) improve latency, throughput, and/or predictability; and/or (5) enable a software ecosystem because multiple stakeholders may benefit from one or more improvements.

FIG. 18 illustrates an example embodiment of a preknowledge-based zoning workflow in accordance with example embodiments of the disclosure. Although the embodiment illustrated in FIG. 18 is not limited to any particular implementation details, in some embodiments it may be implemented, for example, by the partitioner component 726 illustrated in FIG. 7.

The embodiment illustrated in FIG. 18 may begin at operation 1802 where a zone member plan may be created by comparing a read ratio of each client in a preknowledge table to zone read ratio thresholds. At operation 1804, the workflow may iterate the zone member plan and calculate each zone's demand amount based on the member client's working set size (for a read intensive zone) or working volume size (for other zones). At operation 1806, the workflow may adjust the zone size proportionally based on the demand amount of each zone. At operation 1808, the workflow may assign clients to zones based on the zone member plan and the zone size plan.

Figure 19:
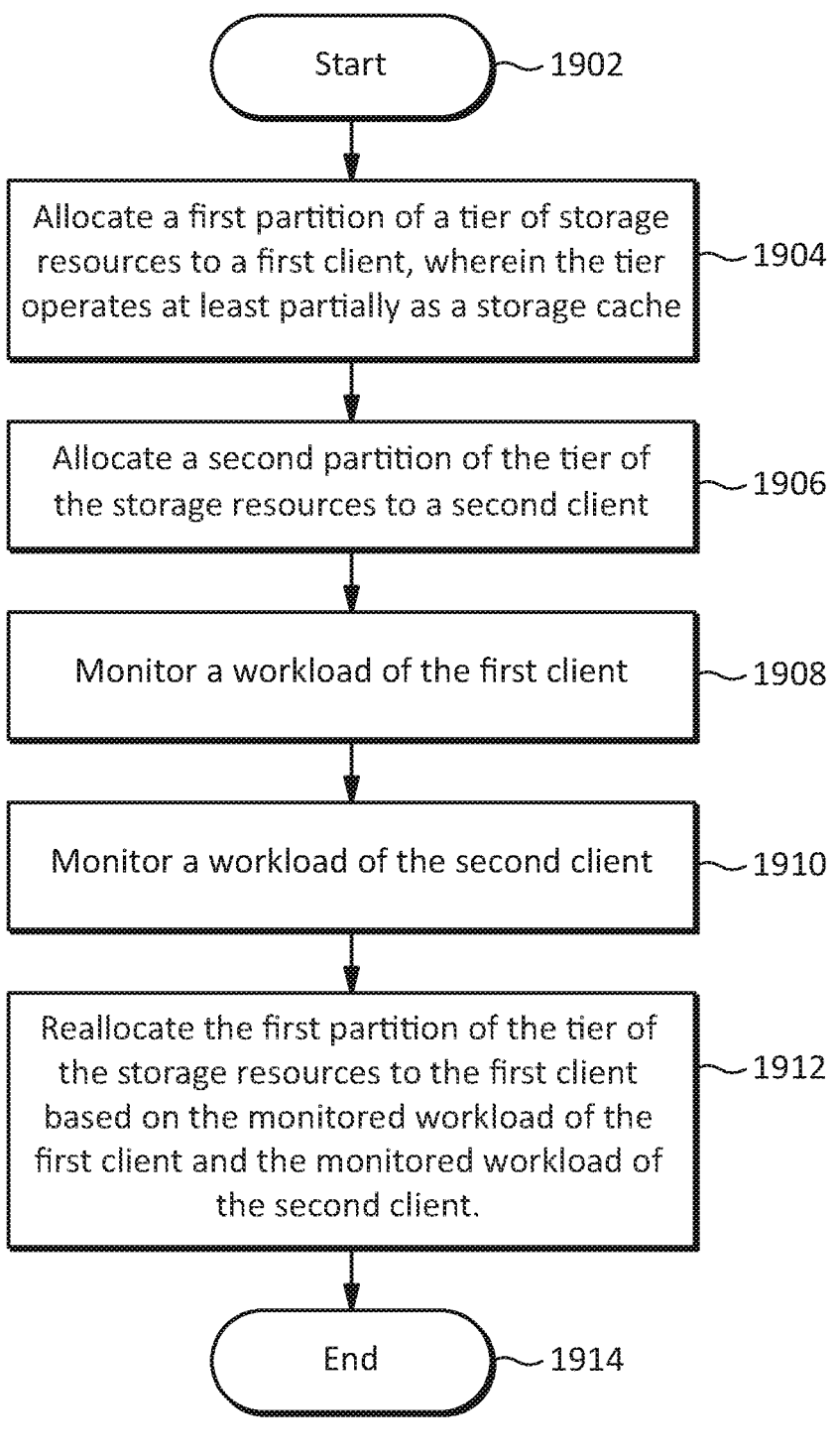
FIG. 19 illustrates an embodiment of a method of operating a storage system in accordance with example embodiments of the disclosure.

FIG. 19 illustrates an embodiment of a method of operating a storage system in accordance with example embodiments of the disclosure. The method may begin at operation 1902. At operation 1904, the method may allocate a first partition of a tier of storage resources to a first client, wherein the tier operates at least partially as a storage cache. At operation 1906, the method may allocate a second partition of the tier of the storage resources to a second client. At operation 1908, the method may monitor a workload of the first client. At operation 1910, the method may monitor a workload of the second client. At operation 1912, the method may reallocate the first partition of the tier of the storage resources to the first client based on the monitored workload of the first client and the monitored workload of the second client. The method may end at operation 1914.

Embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, step, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, "based on" may refer to "based at least in part on." In some embodiments, "allocate" may refer "allocate at least in part." A reference to a first element may not imply the existence of a second element. Various organizational aids such as section headings and the like may be provided as a convenience, but the subject matter arranged according to these aids and the principles of this disclosure are not defined or limited by these organizational aids.

The principles disclosed herein have independent utility and may be embodied individually, and not every embodiment may utilize every principle. However, the principles may also be embodied in various combinations, some of which may amplify the benefits of the individual principles in a synergistic manner. Thus, the various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of partitioning a tier of storage resources, the method comprising:

determining a read working volume of a first client of the tier of storage resources and a second client of the tier of storage resources and a write working volume of the first client of the tier of storage resources and the second client of the tier of storage resources, the read working volume including a first total amount of data read, the write working volume including a second total amount of data written, the read working volume is different from the write working volume, the tier of storage resources include a hardware resource;

determining a read ratio based on the read working volume and the write working volume;

determining a workload type based on the read ratio; and partitioning the tier of storage resources hardware resource between the first client and the second client based on the workload type, wherein the storage resources include a hardware resource.

2. The method of claim 1, wherein:

the method further comprises determining a working set size based on the workload type, the working set size including a total address range of accessed data; and partitioning the tier of storage resources between the first client and the second client based on the workload type includes partitioning the tier of storage resources between the first client and the second client based on the working set size.

3. The method of claim 1, wherein:

determining a working volume size based on the workload type, the working volume size including a third total amount of data accessed; and partitioning the tier of storage resources between the first client and the second client based on the workload type includes partitioning the tier of storage resources between the first client and the second client based on the working volume size.

4. The method of claim 1, wherein determining the read working volume and the write working volume of the first client of the tier of storage resources and the second client of the tier of storage resources includes determining the read working volume and the write working volume of the first client of the tier of storage resources and the second client of tier of storage resources based at least in part on a first characteristic of the first client and a second characteristic of the second client.

5. The method of claim 1, wherein the first client and the second client are isolated from each other.

6. A storage system, the storage system comprising:

a first tier of storage, the first tier of storage including a first storage device; and a partition manager:

to determine a first read working volume and a first write working volume of a first client, the first read working volume including a first total amount of data read, the first write working volume including a second total amount of data written, to determine a second read working volume and a second write working volume of a second client, the second read working volume including a third total amount of data read, the second write working volume including a fourth total amount of data written, to determine a first read ratio for the first client based at least in part on the first read working volume and the first write working volume of the first client, to determine a second read ratio for the second client based at least in part on the second read working volume and the second write working volume of the second client, to determine a first workload type of the first client based at least in part on the first read ratio, and to determine a second workload type of the second client based at least in part on the second read ratio, and to partition and repartition the first tier of storage between the first client and the second client based at least in part on the first workload type of the first client and the second workload type of the second client.

7. The storage system according to claim 6, wherein the partition manager is configured to partition the first tier of storage between the first client and the second client based at least in part on a first characteristic of the first client and a second characteristic of the second client.

8. The storage system according to claim 6, wherein the partition manager is further configured: to determine a first working set size for the first client based at least in part on the first workload type of the first client, the first working set size including a first total address range of accessed data, to determine a second working set size for the second client based at least in part on the second workload type of the second client, the second working set size including a second total address range of accessed data, and to partition the first tier of storage between the first client and the second client based at least in part on the first working set size and the second working set size.

9. The storage system according to claim 6, wherein the partition manager is further configured: to determine a first working volume size for the first client based at least in part on the first workload type of the first client, the first working volume size including a fifth total amount of data accessed, to determine a second working volume size for the second client based at least in part on the second workload type of the second client, the second working volume size including a sixth total amount of data accessed, and to partition the first tier of storage between the first client and the second client based at least in part on the first working volume size and the second working volume size.

10. The storage system according to claim 6, wherein the partition manager is configured to determine the first workload of the first client based at least in part on a first input/output (I/O) request from the first client and to determine the second workload of the second client based at least in part on a second input/output (I/O) request from the second client.

11. The storage system according to claim 6, wherein the first workload type includes a burst type.

12. The storage system according to claim 6, wherein:

the partition manager includes a partition decision maker configured to determine the partition or repartition of the first tier of storage between the first client and the second client; and the first tier of storage further includes a partitioner to implement the partition or repartition of the first tier of storage between the first client and the second client.

13. The storage system according to claim 6, wherein:

the first storage device is of a first type;

the storage system further comprises a second tier of storage, the second tier of storage including a second storage device of a second type, the second type different from the first type; and the partition manager is further configured to partition and repartition the second tier of storage between the first client and the second client based at least in part on the first workload type of the first client and the second workload type of the second client.

\* \* \* \* \*